United States Patent

Burns et al.

[15] 3,643,034

[45] Feb. 15, 1972

[54] PREFERRED-NONPREFERRED TRUNK GATING EQUIPMENT FOR AUTOMATIC CALL DISTRIBUTION

[72] Inventors: Thomas V. Burns; John M. Catterall; Gary L. Elliott, all of Columbus; Ronald E. Fenstermaker, Reynoldsburg, all of Ohio

[73] Assignee: Bell Telephone Laboratories, Incorporated, Murray Hill, Berkeley Heights, N.J.

[22] Filed: Sept. 19, 1969

[21] Appl. No.: 859,396

[52] U.S. Cl. ....................179/27 D

[51] Int. Cl. ....................H04m 3/64

[58] Field of Search..............179/27 D, 27 DA, 27 FF, 18 D, 179/18 DA

[56] References Cited

UNITED STATES PATENTS 3,364,313 1/1968 Scheinman....................179/27 FF

*Primary Examiner*—Kathleen H. Claffy
*Assistant Examiner*—Thomas W. Brown
*Attorney*—R. J. Guenther and James Warren Falk

[57] ABSTRACT

A system is disclosed for automatically distributing calls on groups of incoming lines through line and trunk link frames to teams of operator positions under control of markers. Frame and position gate circuitry is provided for serving the calls in the approximate order of their arrival. Position trunk gate and marker circuits balance the workload among operators by equalizing call distribution through a plurality of trunk link frames to both heavily and lightly occupied teams of operator positions selectively serving a plurality of different classes-of-calls. Position trunk and class control circuits convey data from the markers to advise operators of the classes of the received calls.

24 Claims, 21 Drawing Figures

INVENTORS: T. V. BURNS
J. M. CATTERALL
G. L. ELLIOTT
R. E. FENSTERMAKER

BY Frederick W. Padden
ATTORNEY

PREFERRED-NONPREFERRED TRUNK GATING EQUIPMENT FOR AUTOMATIC CALL DISTRIBUTION

BACKGROUND OF THE INVENTION

This invention relates to switching systems and particularly to equipment for controlling the equitable and uniform distribution of calls through telephone switching systems. Our invention further relates to facilities which balance the workload among operators by establishing preferred and nonpreferred statuses for operator position trunks and gating the availability of those trunks to equalize the number of calls distributed to operators for service.

As the volume and variety of communication services have continued to expand geographically and with the growing population, so has the demand for operator assistance on calls. Examples of the substantially increasing demand for operator assistance are in the areas of calls for directory assistance, department store ordering, and reservations for transportation and entertainment. In present-day systems, each such call is customarily assigned for speedy and efficient switching to a specific class-of-call treatment as, for illustration, a local 411 or interarea 555–1212 directory assistance call. These calls are typically switched through an automatic call distributor without digit dialing into the distributor and are extended over trunks to groups of operator positions selectively arranged for serving one or more of the classes-of-calls.

The present and projected increases in the volume of operator-assisted calls have stimulated telephone companies to plan new call distributor systems in an endeavor continually to provide customers with efficient and high-quality service at reasonable cost. Among the features in the planned systems are more automatic equipments for performing routine tasks heretofore performed by operators. Importantly, the systems also include larger switching networks and teams of operator facilities with traffic control to serve greater volumes of different classes-of-calls more efficiently than in prior art call distributors.

In large network systems of the contemplated designs, it is a customary practice to simplify the control of switching operations by grouping trunks together into so-called trunk blocks, each of which is terminated in the network and comprises a mixture of trunks serving different classes-of-calls. The allocation of trunks in the different blocks, in addition to equalizing equipment usage and wear, reduces call blockage by improving the availability of call communication paths through the network to operator positions.

It has been determined that as long as teams of operator positions are equally manned by operators and the calls served by such operators are of short duration, the distribution of calls through the network to associated position trunks is adequately uniform and equitable for balancing the workload. In contrast, when the teams become unequally manned, the prior art switching equipments are incapable of balancing the call workload among operators. As a consequence, a lightly manned operator team in such a system may receive more calls requiring assistance than a heavily manned team. This undesirable service condition arises in the prior art because the presently available switching control facilities have no means for determining the order in which operator position trunks within different trunk blocks become idle and are used for serving calls. Moreover, it requires supervisory personnel to spend considerable time and effort for balancing operator work loads through equally staffed teams of operator positions. The latter often becomes an additional problem particularly when operator positions are remotely situated from the main switching machine.

In view of the foregoing, it is apparent that a need exists for equipment which controls the order in which blocks of position trunks become available for serving calls and which enables calls to be distributed equitably to operator position teams regardless of the team size and occupancy.

Accordingly, it is an object of our invention to provide equipment for uniformly and equitably switching calls through a switching network to balance the call workload over trunking facilities.

Another object is to provide switching equipment for balancing the call workload of operators in unequally manner teams serving the same class-of-call.

A further object is to provide control facilities for automatically administering to the order in which trunks in different trunk blocks become available for call service so that equitable distribution is achieved for a plurality of different classes-of-calls through a switching network and the administered trunks to operator position teams despite the size and operator occupancy of positions in those teams.

SUMMARY OF THE INVENTION

In accordance with principles of our invention, uniform and equitable call distribution is made to trunking facilities in different trunk blocks under control of equipment which establishes the order in which the trunking facilities become available for call service. The equipment includes position trunk gates which establish the order by setting preference levels for the trunking facilities that preclude a trunk in each of the blocks from serving a call and thereafter immediately reentering the group of available trunks to serve another call before the priorly available trunks had served a call. This mode of operation equalizes the usage and wear of communication switching facilities and provides for automatic balancing of the workload on operator-served calls. Each of the trunk gates is illustratively operated under common control circuitry to open the gate for a timed interval to establish a preferred status for trunks to idle manned positions and a nonpreferred status for trunks to busy positions. This arrangement ensures that the preferred positions serve calls before the nonpreferred positions are routinely available for call service. In addition, the preference arrangement provides for a form of automatic workload administration which relieves supervisory personnel of substantial time and effort spent in supervising the manning of operator positions to ensure the balancing of workload among operators.

The exemplary embodiment of our invention is integrated into a telephone switching system which is advantageously utilizable as a call distributor system to serve a substantially greater volume of customer directory assistance calls as well as other operator-served calls for department store ordering, airline reservations and the like. The illustrative call distributor switches five different classes-of-calls through a crossbar switching network to blocks of position trunks extending to operator positions via position trunk circuits. Each block of position trunks is illustratively terminated on an individual one of five trunk link frames of the crossbar switch network. Position trunks serving each of the five different classes-of-calls are allocated over each of the trunk blocks on all of the link frames.

It is a feature of our invention that an individual position trunk gate circuit is provided for each class-of-call to control the preferred-nonpreferred availability of all position trunks serving the same class-of-call. According to our invention, each of the five position trunk gate circuits is controllable by five common control marker circuits to initiate a timed gate opening for admitting to a preferred status position trunks associated with idle manned operator positions serving the associated class-of-call while retaining as nonpreferred those trunks busy serving calls. During the gate opening, the position trunk gate operates a preference relay in each of the associated idle position trunk circuits to enable the associated position trunk to be marked on the trunk link frame as available on a preferred basis.

According to the illustrative embodiment, the preference relay in each position trunk circuit cooperates with the markers to mark two conductors extending to one of the trunk link frames for indicating the preferred-nonpreferred status of that trunk circuit. Each preference relay is arranged to signal the marker via the two conductors and cross-connection circuitry in the associated trunk link frame to identify the class-of-call with which the position trunk is associated and to enable the marker appropriately to select a preferred or nonpreferred trunk.

When a marker is engaged in processing a call, it gains access to all of the trunk link frames and tests, in accordance with our invention, first for the availability of at least one preferred position trunk of the desired class in any of the trunk blocks. If a preferred trunk is found, the marker proceeds to select such an available trunk and to establish call connections thereover to the associated operator position for service. A marker is capable of engaging a trunk link frame to test for the availability of preferred trunks of a desired class even if another marker is busy establishing call connections through that frame. In performing the latter test, a marker may determine that a preferred trunk is idle, but is unavailable for serving a call in that marker because that trunk is terminated on a trunk link frame which is busy cooperating with another marker. In accordance with our invention when the marker makes the latter determination, it immediately advances to test and select a nonpreferred trunk of the desired class on an idle one of the trunk link frames and without opening the position trunk gate for that class. An advantage achieved by this advance aspect of our invention is that the preferred-nonpreferred statuses of position trunks are not altered so that equitable call distribution to the preferred trunks is resumed on a subsequent call following the release of the marker from the cooperating trunk link frame.

Another feature of our invention is that circuitry is provided in each marker for advancing to test for available nonpreferred trunks when it is determined that no preferred trunk is available for service. Concurrent with the testing for nonpreferred trunks the marker effects the opening of the position trunk gate to admit idle nonpreferred trunks to a preferred status. The marker during the gate opening is arranged, in accordance with our invention, to select an available one of the trunks regardless of its preferred-nonpreferred status. The illustrative embodiment advantageously controls all advances for the testing and selection of nonpreferred trunks under control of timer circuitry in the markers.

It is a further feature of our invention that a marker is equipped to select a preferred one of the trunk blocks on a trunk link frame and then, advantageously, to specify the class of the desired idle trunk while distinguishing between preferred and nonpreferred idle trunks in that block. This marker equipment cooperates with the preference relays in trunk circuits to enable a preferred trunk to be selected over a nonpreferred trunk in the same block.

The foregoing and other objects, features and advantages, of our invention are more fully understood from a reading of the following descriptions with reference to the drawing in which.

Figure 1:
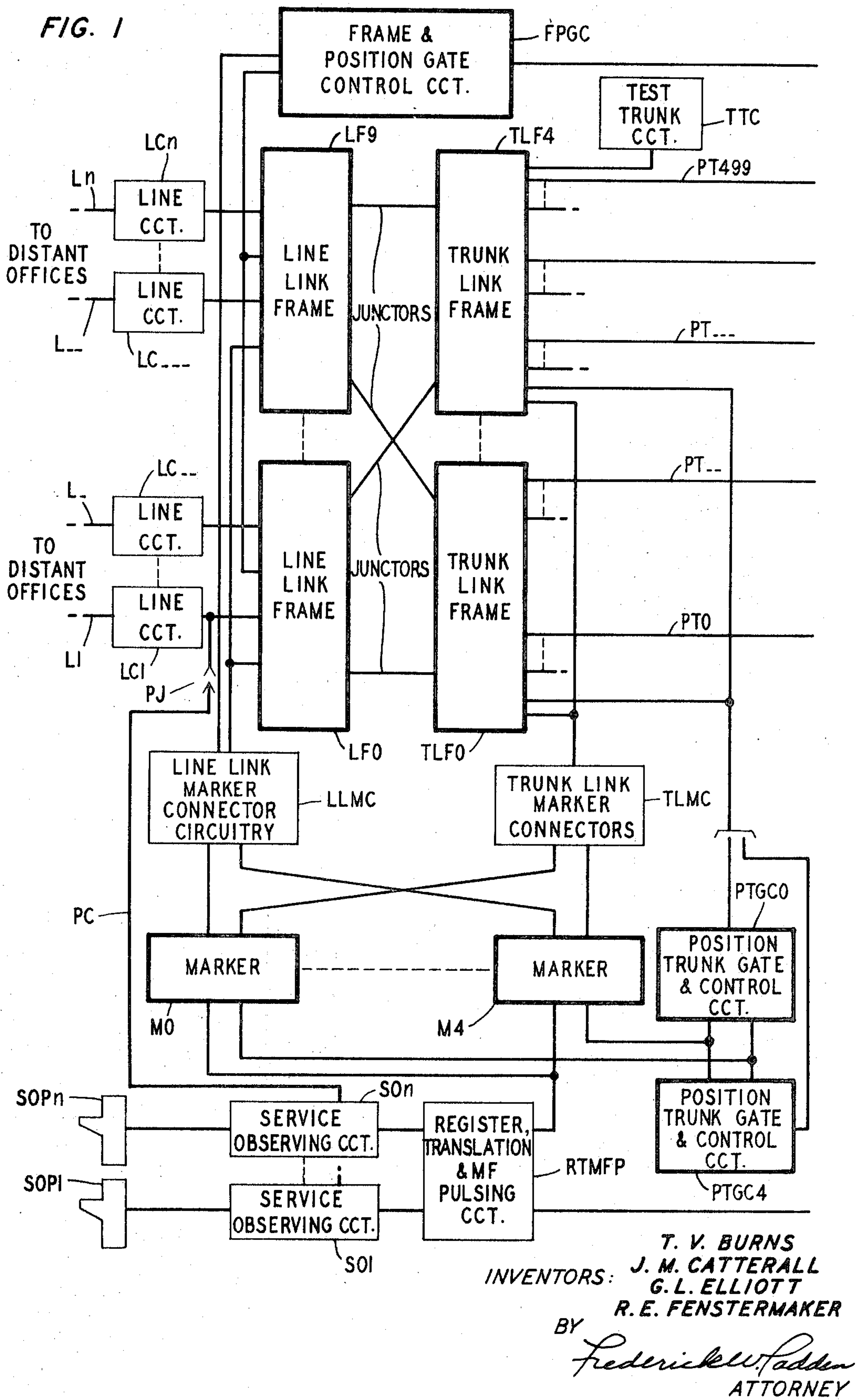
FIGS. 1 and 2 show, in block diagram form, an ACD system in which the equipment illustrative of our invention has been embodied.

It is noted that FIGS. 4–20 employ a type of schematic notation referred to as "detached-contact" in which an X crossing a line represents a normally opened contact of a relay and a bar crossing a line represents a normally closed contact of a relay; "normally" referring to an unoperated condition of a relay. The principles of this type of notation are described in an article entitled "An Improved Detached-Contact-Type Schematic Circuit Drawing" by F. T. Meyer in the Sept. 1955 publication of the *American Institute of Electrical Engineers* (AIEE) *Transactions, Communications and Electronics*, vol. 74, pages 505–513.

Each relay contact is designated in the drawing in a manner which indicates the relay of which it is a part as well as uniquely identifies it with respect to the other contacts of the relay. For example, referring to relay contact SL1-1 in FIG. 4, it is noted that the "SL1" portion of the designation indicates that it is controlled by relay SL1 of FIG. 5 and the "-1" portion uniquely identifies it with respect to other contacts such as SL1-2 of relay SL1, the latter contact being shown in FIG. 4.

The equipment of the present invention may be advantageously incorporated, by way of example, in a crossbar telephone switching system wherein common control circuits including markers are employed to control the establishment of call connections through a crossbar switching network. One such system is disclosed in A. J. Busch, U.S. Pat. No. 2,585,904 of Feb. 19, 1952. It is to be understood, however, that the present invention is not limited to use with a telephone system of this type, but that it may also be utilized with other types of switching systems.

The equipment illustrative of the principles of the present invention has been embodied in a crossbar system of the type disclosed in the Busch patent. It is particularly concerned with the apparatus in the frame and position gate control circuit, line link frames, position trunk gate and control circuits, trunk link frames, and marker circuits shown in heavy lines in FIGS. 1 and 2. The other equipment units are neither shown nor described in detail herein except where necessary for a complete understanding of our invention. Structural details of the position trunk and control circuit of FIG. 2 are set forth in R. M. Morris- J. M. Repholz, U.S. Pat. application, Ser. No. 779,932 filed Nov. 29, 1968. The latter application and the Busch patent may be consulted for a complete understanding of the construction and operation of the units not covered in detail herein.

GENERAL DESCRIPTION

Figure 2:
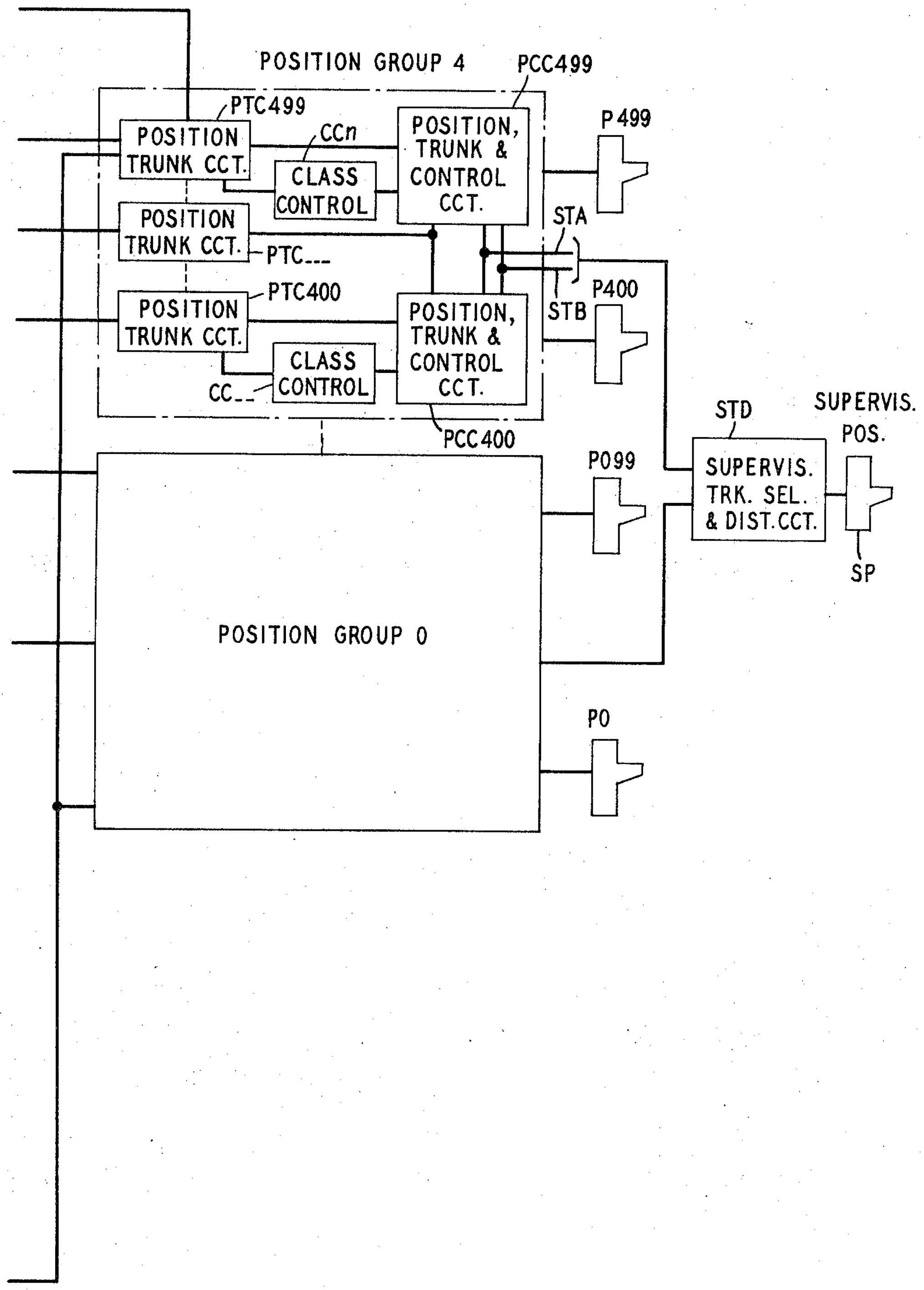
Figure 3A:
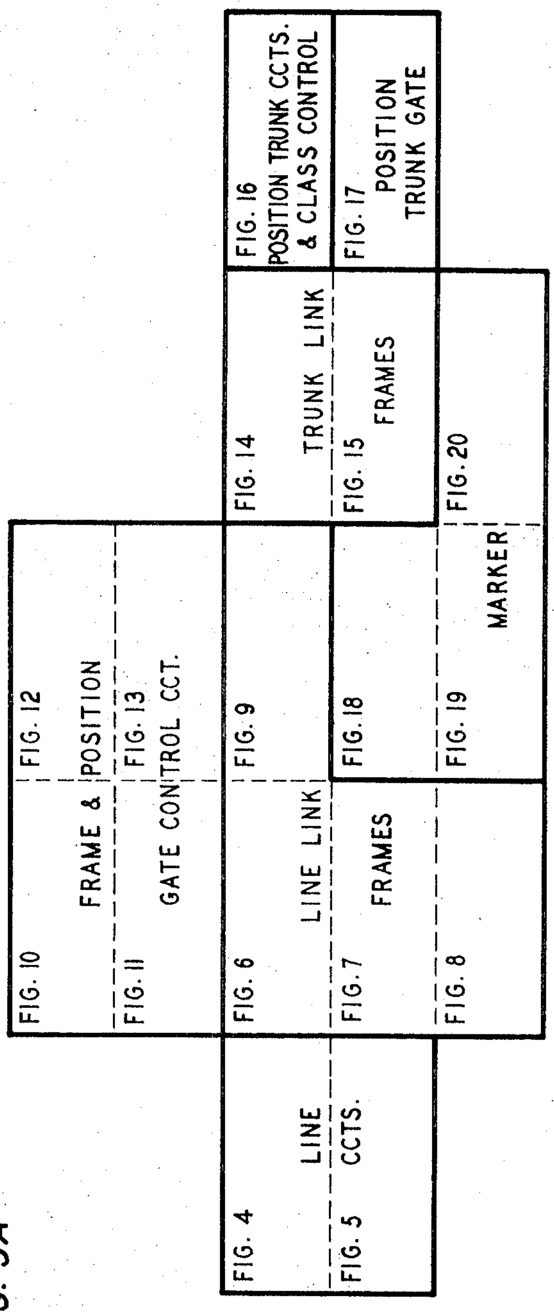
FIGS. 3 and 3A depict the positions in which FIGS. 1 and 2 and FIGS. 4 through 20 should be placed to show the cooperation between equipment units of the ACD.
Figure 3:
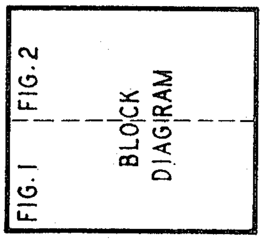

Referring to FIGS. 1 and 2, the switching network of the ACD is arranged by way of example with 10 line link frames LF0–LF9 and five trunk link frames TLFO–TLF4 for terminating a maximum of 2,400 incoming lines and 600 trunks for operator positions and maintenance testing. The exemplary ACD receives calls on incoming line circuits LC1–LCn over lines L1–Ln from distant offices such as those which serve local or tandem call traffic. Line circuits LC1–LCn terminate on the link frames LF0–LF9 for the distribution of received calls to a maximum of 500 operator positions PO–P499 via position equipment including position trunks PT0–PT499 which terminate on the trunk link frames TLF0–TLF4.

Our illustrative embodiment advantageously utilizes in its call distributing procedure a modified version of what is known in the art as the "dial tone" job of the Busch system. This job as explained in columns 6–33 of the Busch patent provides for the connection of a call originating line circuit under control of markers through a line and trunk link switching network to originating registers which return dial tone for signaling the caller to commence dialing of the called number. Our embodiment substitutes operator position trunking facilities for the originating registers for connecting received calls to operator positions for service.

In the illustrative ACD, a plurality of different classes-of-calls are distributed to operator positions and such positions are arranged in teams, or groups, each of which is equipped for serving one or more of the classes-of-calls. Among the classes-ofvcalls are, by way of example, individual classes for local 411 and 555-1212 directory assistance calls while other of the classes are available for airline and department store services. An example of the use of this feature is the distribution of local information calls to operators who only are equipped with local directories and toll information calls to operators with toll books. Line circuits LC1-LCn are segregated in groups on the line link frames LF0-LF9 and each such group serves one class-of-call. The identification of each class-of-call is derived by a marker from the locations of line circuits in crossbar switch horizontal groups, vertical groups and files on the line link frames LF0-LF9.

Each incoming call is received in a line circuit, such as circuit LCn, and a request is immediately generated for a connection to an operator position arranged to serve that call. The request is served in the approximate order in which it is received with respect to other calls and under control of a frame and position gate control circuit FPGC. The latter controls frame gates on all line link frames LF0-LF9 by interrogating such frames for requests, or starts, during a prescribed time interval and then begins a gate cycle to serve sequentially from frame LF0 to frame LF9 each requesting frame that has starts during the interval. Control circuit FPGC gates service requests, or starts, initially by line link frames and then by class-of-calls, or routes, to operators. The FPGC circuit control of frame gates prevents heavily traffic loaded line link frames from monopolizing markers M0-M4 by blocking any frame starts arriving after a gate cycle begins and making such starts wait until the next gate cycle to be served. As each frame within the gate is served during a cycle, its frame gate is opened, or ungated, by control circuit FPGC and those line circuits with service requests on the frame are admitted into its gate for service during the next gate cycle. When all of the frames that gained entry to the gate cycle have been ungated, the gate cycle ends. Thereafter, the gate control circuit recognizes new starts and initiates a new gate cycle to serve new requests. Starts, or service requests, which pass through a frame gate are presented to position queue gates in the line link frame for the desired operator route. The function of the queue gates, which are provided on a class-of-call, or route, basis is to ensure that later-arriving service requests in each route do not receive service ahead of earlier call arrivals in the same class. A queue gate blocks the later-arriving requests until all of the earlier call requests have been connected to operators. Thereafter, the later-arriving requests are admitted into the position queue gate for seizing a marker if positions are available for serving the admitted class-of-call.

Gate control circuit FPGC also continuously monitors the busy-idle condition of position trunks used for the class-of-calls. Such action precludes high calling rates for one class-of-call from causing excessive workloads on markers and interference with call completions for other of the classes-of-calls when positions are unavailable. When all occupied ones of the positions P0-P499 for a class-of-call are found busy, gate control circuit FPGC closes all position gates associated with that class on the line link frames LF0-LF9 to prevent marker seizures for calls attempting to establish connections to a busy position.

Line link frames LF0-LF9 having a call admitted within a position queue gate and for which there is an available position, present marker bidding signals to line link marker connector circuitry LLMC. The latter connects an idle one of five ACD markers M0-M4 to a preferred one of the bidding link frames LF0-LF9. The connected marker then proceeds to select a preferred calling line circuit within the queue gate for connection to a desired operator position. An idle one of the position trunks PT0-PT499 on trunk link frames TLF0-TLF4 is next selected by the marker preparatory to the establishment of connections between the preferred calling line circuit and a selected position trunk via the appropriate line and trunk link frames.

Position trunks PT0-PT499 are terminated on trunk link frames TL0-TLF4 and are connected to respective position trunk circuits PTC0-PTC499 which provide for call supervision, signaling and switching functions. In accordance with our invention, the trunk circuits are divided into groups, or trunk blocks each of which contains trunk circuits associated with each class-of-call. Position trunks for each class-of-call are distributed equitably over all trunk blocks. Each trunk link frame TLF0-TLF4 illustratively terminates a maximum of 120 trunk circuits for a total of 600 on the five trunk link frames TLF0-TLF4. Each of the trunk blocks on each frame TLF0-TLF4 comprises 20 trunk circuits each of which, except those reserved for testing and miscellaneous services, is associated with an individual one of the operator position P0-P499 via respective one of the position, trunk and control circuits PCC0-PCC499. According to our invention, a marker selects position trunks in two steps by: (1) selecting a trunk block having idle occupied operator positions for a calling class-of-call and (2) selecting a position among the idle occupied ones in the selected block.

It is a salient feature of our invention that nonuniform workloads on the operator positions are virtually avoided by advantageously distributing received calls among position trunk blocks in proportion to the number of positions occupied by operators within the individual trunk blocks. Control over such distribution is maintained according to this illustrative embodiment by the position trunk gate and control circuits PTGC0-PTG4. Each of the latter circuits is associated with an individual one of the five classes-of-calls, or routes, and establishes two levels of priority for position trunks, namely, preferred and nonpreferred. A preferred group are those trunks inside the position gate of a circuit PTGC0-PTGC4 and associated with an idle occupied position. A nonpreferred group is one with trunks outside the position gate and associated, for example, with positions which are busy serving calls or have already served calls on a rotating basis. A marker is advantageously arranged to select all of the preferred groups of position trunks for a given class before advancing to open the position gate for that class to permit a nonpreferred group of idle occupied positions to become preferred. The priority levels establish an order of selection and distribution of calls so that trunk blocks with a greater number of occupied positions receive more calls for service. A marker distributes calls uniformly across the preferred positions within a trunk block by advantageously utilizing rotating patterns for selecting position trunks. These patterns are used in rotation, for example, after every 20 calls served by a marker.

Each of the markers M0-M4 is arranged for initially attempting to select a trunk block having preferred position trunks and then a preferred one of such trunks within that block. If a marker finds no preferred position trunks, it causes the opening of the appropriate one of the position trunk gates PTGC0-PTGC4 for the desired class-of-call to permit nonpreferred position trunks of the desired class-of-call associated with idle occupied positions to enter the position trunk gate and become preferred. During such gate opening interval, the marker selects an associated idle, operator occupied one of the positions irrespective of its preference level.

Thereafter, a marker selects an available communication channel through the line and trunk link frames between the calling line circuit and a selected position trunk. It next proceeds to check the channel for continuity, false cross and ground as well as the presence of a test tone on the tip and ring path of the selected channel. The tone is utilized on test calls made by a craftsman over any one of the incoming lines Ll-Ln. The tone uniquely identifies the call as a test and a marker upon detecting the tone is directed to recycle and connect the call to a test trunk circuit, such as circuit TTC, instead of the selected position trunk circuit. The recycle operation causes a marker to release the selected channel and position trunk circuit and to select both an idle test trunk circuit and an available channel through the line and trunk link frames for serving the test call.

On calls other than test calls, data for advising an operator of the class-of-call is transmitted by the marker through a position trunk circuit to a class control circuit such as circuit CCn, for temporary storage and subsequent use in controlling the illumination of a class lamp (not shown) at the operator position. Different class control circuitry is used for local and remotely located operator position arrangements. For local positions, the class data is transmitted from a marker illustratively by DC signaling to the class control circuit for storage. Remote position arrangements cause the marker to send class data to the class control circuit by multifrequency signaling. Following the data storage, the class control circuit operates the associated position, trunk and control circuit for sending a zip tone to the operator and lighting the appropriate class lamp to aid the operator in serving the call.

Calls extended to position trunk circuits are processed to the operator positions under control of the position, trunk and control circuits PCC0–PCC499. Each of the latter circuits, such as circuit PCC499, cooperates with two position trunk circuits, such as circuits PTC—and PTC499. One of the trunk circuits, such as circuit PTC499, is a primary path for switching all incoming calls to the associated position, such as position P499. A secondary trunk circuit, such as circuit PTC—, is common to a plurality of other of the operator positions and is used for enabling an operator to continue serving calls on an overlap basis after a call on the primary trunk circuit is transferred to a supervisory operator for assistance.

Each of the control circuits PCC0–PCC499 is furnished with two supervisory trunks, such as trunks STA and STB, that enable it to be connected to a supervisory operator console. Supervisory trunk STA, for illustration, is a preferred trunk and is shared by a plurality of the operator positions. The secondary trunk STB, for example, is shared by another plurality of operator positions and is used when the preferred trunk is busy. Either such supervisor trunk is seizable on a call and connected to the primary or secondary position trunk circuit.

A call to a supervisor is made by an operator through a supervisor trunk selecting and distribution circuit STD which is shared by operator positions assigned to a chief operator group. Circuit STD provides a voice transmission path which is used initially by an operator to talk to the supervisor, with or without a customer call attached to her position and subsequent to the bridging of the path toward the primary or secondary trunk circuit involved on the call. The call to the supervisor is made by a momentary depression of a key, for example, at the operator position. This action results in the seizure of a preferred or secondary supervisor trunk. Upon the latter seizure, a lamp at the supervisory position starts flashing as a signal to the supervisor that an operator call is waiting.

For transferring a call to the supervisor, an operator causes a hold condition to be placed on the associated primary or secondary trunk circuit and then the seizure of a supervisory trunk as previously explained. When the supervisor requests a transfer of a call, the operator by key manipulations effects the transfer of the primary or secondary trunk to the supervisor trunk STA or STB for service. The transferring operator position is then automatically cut off from the call connections. After circuit STD has completed the functions of transferring a call on a primary trunk circuit to the supervisor position, the transferring operator position is automatically made available for serving other calls over the secondary trunk circuit until the primary trunk circuit is released by the supervisor or by the termination of the transferred call by the customer.

The illustrative ACD is equipped with service observing facilities which enable observers to monitor the quality and operational performance of the system and the operators. The facilities include service observing circuits SO1–SOn which are selectively connected by means of patch cord and jack arrangements to line circuit terminations on line link frames LF0–LF9. Illustrative of such an arrangement is the connection of observing circuit SOn by patch cord PC and jack PJ to the LF0 line link frame appearance of line circuit LC1 for service observation. When observer at the service observing positions SOP1–SOPn becomes available for an observation, the associated one of the observing circuits SO1–SOn is placed on line for an observation. Each of the latter circuits is equipped with a seizure detector which detects an incoming call on the observed line circuit and bids for an idle register, translation and multifrequency (MF) pulsing circuit RTMFP that is shared by a plurality of observing circuits SO1–SOn. When seized by the bidding circuit, circuit RTMFP causes an idle observer position to be seized. If the call is accepted for observation at such a position, an acceptance signal is returned to the associated one of the observing circuits SO1–SOn. The RTMFP circuit then disables all seizure detectors of the other observing circuits to prevent new observations on those circuits until the RTMFP circuit is again available for another call observation.

During the time that the observed line circuit is awaiting connection to an operator position P0–P499, the seizure detector in the engaged one of the observing circuits SO1–SOn monitors the tip and ring path to sense a calling party abandonment of the call. If an abandonment does not occur, the engaged observing circuit detects the connection of the observed line circuit through the line and trunk link frame network to an operator position under control of a marker. Display facilities at the observer position are then activated by the observing circuit to indicate that a call is being observed. The marker next proceeds to transmit class-of-observed call data to the observer position and the operator position trunk circuit sends to circuit RTMFP for registration the position data including, for example, the identities of the position trunk, traffic office and chief operator group. Thereafter, the marker signals circuit RTMFP to MF outpulse the register class and position data to the observer position for display.

DETAILED DESCRIPTION

Line Circuit

Figure 4:
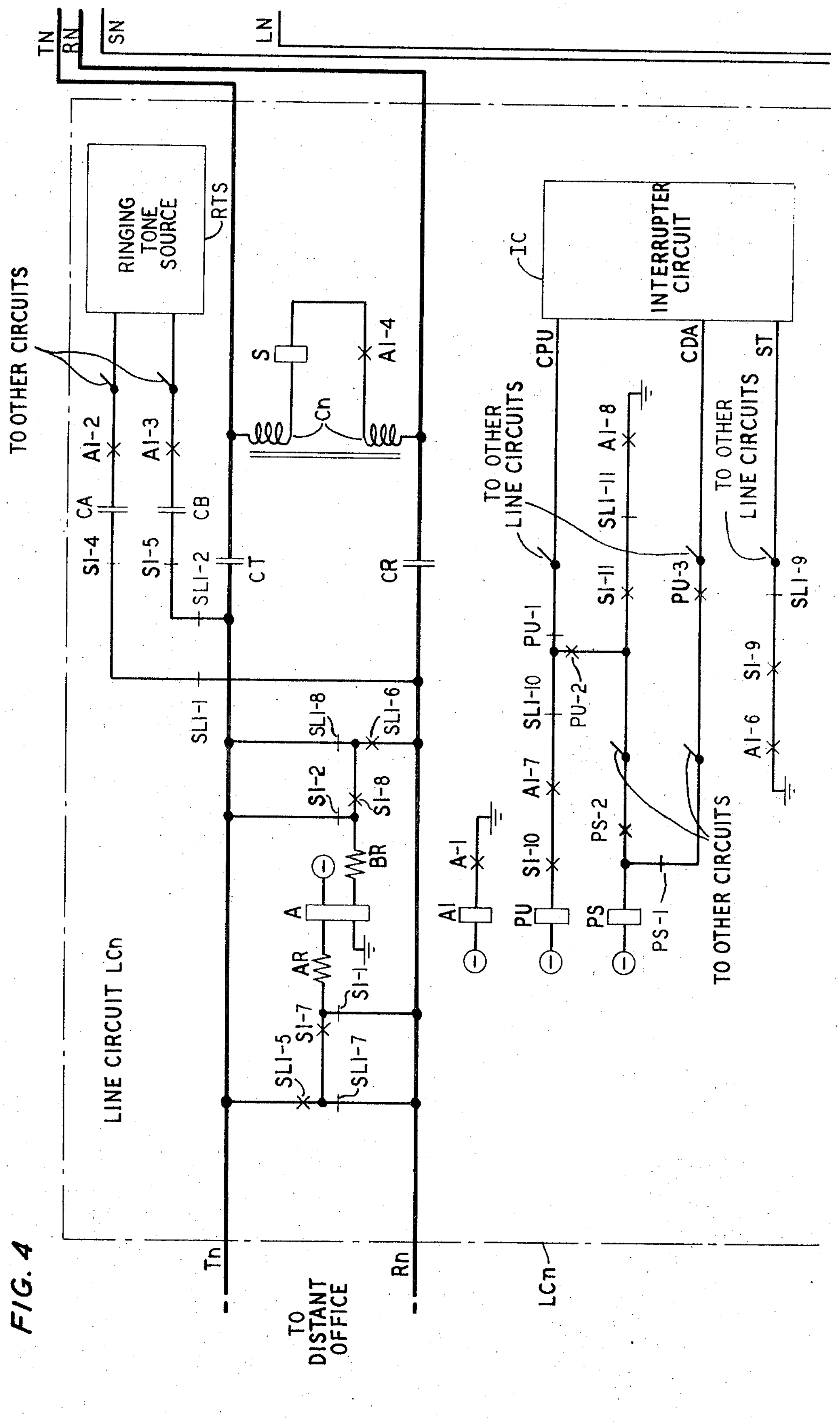
FIGS. 4 and 5 are schematic and block diagrams of the line circuits used in the ACD.
Figure 5:
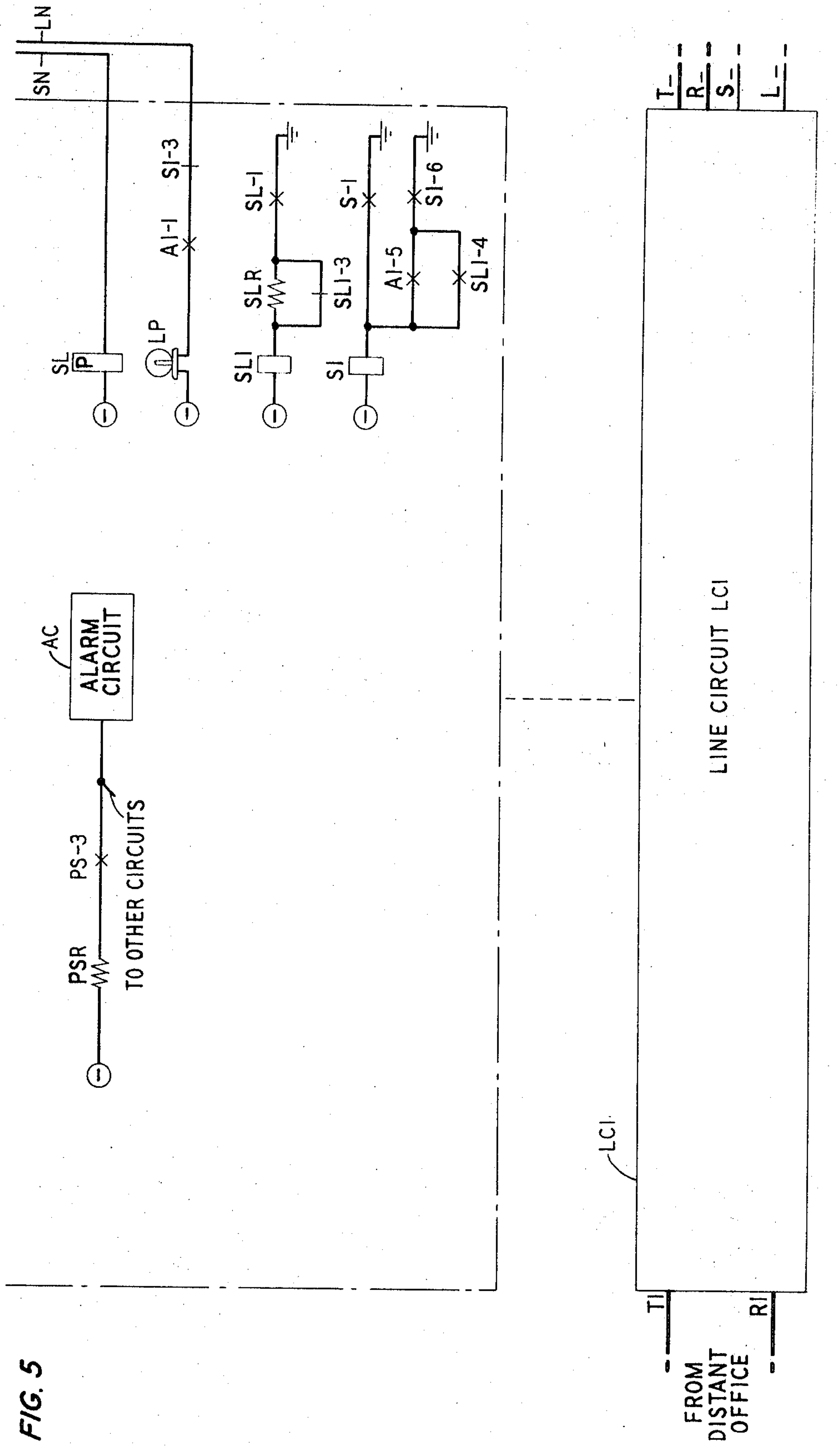

Referring to FIGS. 4 and 5, a detailed description is presented of the circuit operations involved in providing incoming line circuits LC1–LCn with connections to operator positions P0–P499. For simplifying the description, it is deemed convenient to describe the manner in which line circuit LCn of FIGS. 4 and 5 requests connections to an operator position. When circuit LCn receives an incoming call, a conventional loop closure is applied at a distant office trunk circuit (not shown) to the tip and ring conductors Tn and Rn to effect the operation of relay A via the contacts S1–1 and S1–2 and resistors AR and BR to negative potential and ground, respectively.

In operating, relay A1 connects ringing tone back over the established tip and ring path to the calling station to inform the caller of the call progress. The ringing tone extends in FIG. 4 from the source RTS through contacts A1–2 and A1–3, capacitors CA and CB, contacts S1–4, S1–5, SL1–1 and SL1–2 to conductors Tn and Rn.

In operating, relay A activates relay A1 over the obvious path through contact A–1 to ground. The operation of relay A1 causes a service request signal to be applied to line link frame LF9 of FIG. 6 for requesting a connection to an operator position. The request signal is registered on a relay LO of Fig. 7 under control of the frame and position gate control circuit FPGC as hereinafter explained. The start signal is applied to the winding of relay L0 over a path extending over conductor LN, contacts S1–3 and A1–1 and a resistance lamp LP to negative potential. Relay LO is a line relay whose contacts form part of a frame gate for a horizontal group 9 within a vertical group 0 of the crossbar switch network on the line link frame LF9. The service request signal causes the operation of relay LO for initiating circuit actions which cause an appropriate operator position to be connected to circuit LCn as hereinafter explained.

During the establishment of the latter connection, relay SL of FIG. 5 is operated in response to a ground supplied to the sleeve conductor SN in a conventional manner under control of a marker engaged on the call. The operation of relay SL activates an auxiliary relay SL1 of FIG. 5 over the path from ground through contacts SL–1 and SL1–3 in parallel with resistor SLR. In operating, relay SL1 opens its contact SL1–3 to reduce the steady state current drain through relay SL1 during the remainder of the call. Operated relay SL1 also disconnects the ringing tone from the tip and ring conductors Tn and Rn at contacts SL1–1 and SL1–2.

Upon the connection of an operator position to line circuit LCn, an operator answers and it effects the operation of a supervisory relay S of FIG. 4. Relay S operates in series with the contact A1–4, coils Cn, and battery and ground potentials supplied from the operator position facilities to conductors TN and RN of the tip and ring path. The operation of relay S, in turn, operates relay S1 of FIG. 5 over the path through contact S–1 to ground and relay S1 then locks under control of relay A1 through contacts A1–5, SL1–4 and S1–6 to ground. In operating, relay S1 removes the position request signal from conductor LN by opening contact S1–3 and thus to lock out, under control of relay A1, further requests for operator positions until relays A and A1 are released. Operated relay S1 also sends a conventional supervisory signal (battery reversal) over the tip and ring conductors Tn and Rn under the control of the contacts S1–7 and S1–8 in cooperation with the transfer contacts SL1–5 to SL1–8 as a signal to the distant office of the cut-through of call connections. Talking path connections for the call are thereafter completed between the calling station and the operator position via the line circuit LCn tip and ring path including conductors Tn, Rn, capacitors CT and CR and the conductors TN and RN.

Established procedures for automatic call distributor systems specify that an operator should remain on a connection until it is released by the calling party disconnect. However, an undesirable service condition occasionally arises in automatic call distribution when the operator offers her assistance but there is no caller response. This service condition can arise, for example, due to so-called false starts which simulate a regular call request for service and which are produced by electrical problems on the calling incoming line from the distant office. The condition also arises after an operator furnishes service and the caller fails to hang up. As a result of such troubles, call connections through the switching network as well as control circuits are undesirably held out of usable service. In addition, operators are confronted with the tedious and time-consuming task of determining the existence of such troubled conditions.

In the past, operators have been able to recognize when their assistance is not needed after a caller failure to hang up or due to a possible trouble, and they have, after reasonable waiting times, generally caused their position facilities to be released from the call connections. This procedure has been generally satisfactory for causing customers to hang up, but it has proven ineffective in certain distributor systems for serving those lines which have "false start" troubles. In the latter case, when an operator releases the call connections, the troubled line immediately requests and is connected to another operator position.

Each of the line circuits LC1–LCn is equipped with circuitry for locking out position request signals after a call is answered by an operator and for precluding such a request from being falsely reinitiated after an operator releases and a false cross or ground persists on an incoming line.

In accordance with the exemplary embodiment, an operator is authorized to release from a call connection after a prescribed interval following a failure of the caller to hang up or upon a determination that a troubled condition, rather than an actual call, has caused a connection to her position. In either of the latter cases, an operator actuates a release key at her position which effects the release of connections between her position and the line circuit LCn. These operations cause the release of relays S and SL by opening the previously described operate paths for these relays. The release of relay SL opens its contact SL–1 to effect the release of relay SL1 which, in turn, connects a seizure ground to the interrupter circuit IC via the start lead ST and the contacts SL1–9, S1–9 and A1–6. When seized, interrupter IC operates the pickup relay PU of FIG. 4 via contacts S1–10, A1–7, SL1–10 and PU–1 to a ground on conductor CPU. In operating, relay PU locks under control of contacts PU–2, SL–11, SL1–11 and A1–8 ground. The operation of relay PU also opens the connection to lead CPU at contact PU–1.

A permanent signal alarm relay PS of FIG. 4 is also connected to interrupter IC upon the operation of relay PU and over the path from the relay winding through contact PS–1 and PU–3 to conductors CDA. Relay PS is operated under the control of interrupter IC which applies a ground via conductor CDA and contacts PU–3 and PS–1 to the relay winding at the end of a time interval to indicate a permanent signal condition when relay A is not released under control of the calling party or a false seizure condition. In operating, relay PS locks via contacts PS–2, S1–11, SL1–11 and A1–8 to ground. The operation of relay PS causes audible and visual alarms to be given for the attention of maintenance personnel. The alarm condition is effected by activating the alarm circuit AC of FIG. 5 over a path through contact PS–3 and resistor PSR to a negative potential.

When a calling party hangs up or a false seizure trouble on the incoming tip and ring conductors Tn and Rn is cleared at any time during the IC interrupter timing interval or during the line lockout, relays A and A1 are released by the opening of the tip and ring loop for, in turn, releasing all other operated relays and returning circuit LCn to its idle state.

LINE LINK FRAMES (FIGS. 6–9) AND FRAME AND POSITION GATE CONTROL CIRCUIT (FIGS. 10–13)

Equipment on each line link frames LFO–LF9 is arranged to receive requests for service from associated line circuits and to serve such requests in the approximate order that they are received under control of a frame and position gate control circuit FPGC of FIGS. 10–13. The equipment also provides for connecting paths from the line circuits through crossbar switches toward position trunks on the five trunk link frames TLF0–TLF4 under selective control of the five markers M0–M4.

Each line circuit terminated on a line link frame is associated with a specific class-of-call by its assignment within a particular vertical group on crossbar switches on that line link frame. All lines associated with a particular vertical group are assigned to the same class by class-of-service cross-connections in the markers MO–M4 in a manner similar to that disclosed in the Busch patent. The crossbar switch arrangements on each line link frame and the control of such arrangements in establishing call connections are also similar to that disclosed in Busch. Accordingly, the crossbar switches and control arrangements are disclosed herein in block diagram form, for example by the block CSC in FIG. 6 for line link frame LF9.

Requests for service are gated through the line link frames under control of three gates including a frame, route, and position gates provided on each of the frames LFO–LF9. All three gates operate to reduce individual call delays by establishing call connections in the approximate order in which service requests are received. The frame gate admits all service requesting line circuits for service at the beginning of a gate cycle controlled by the control circuit FPGC and locks out other line circuits subsequently requesting service until the end of the gate cycle. There is a route gate on each line link frame for each class-of-call served by the line circuits terminated on that frame. Each route gate is opened to admit requests when operator positions are available for serving calls associated with that route. It is closed to block later arriving requests of line circuits in the same class from being connected to an operator position before the earlier admitted requests. The position gates are controlled by the gate control circuit FPGC to monitor the busy-idle status of operator positions for each of the routes. When all operator positions for a route are busy, the position gate for that route blocks admitted service requests of that route from engaging a marker which otherwise would cause the marker to perform unnecessary operations in attempting to establish connections to busy operator positions.

Figure 6:
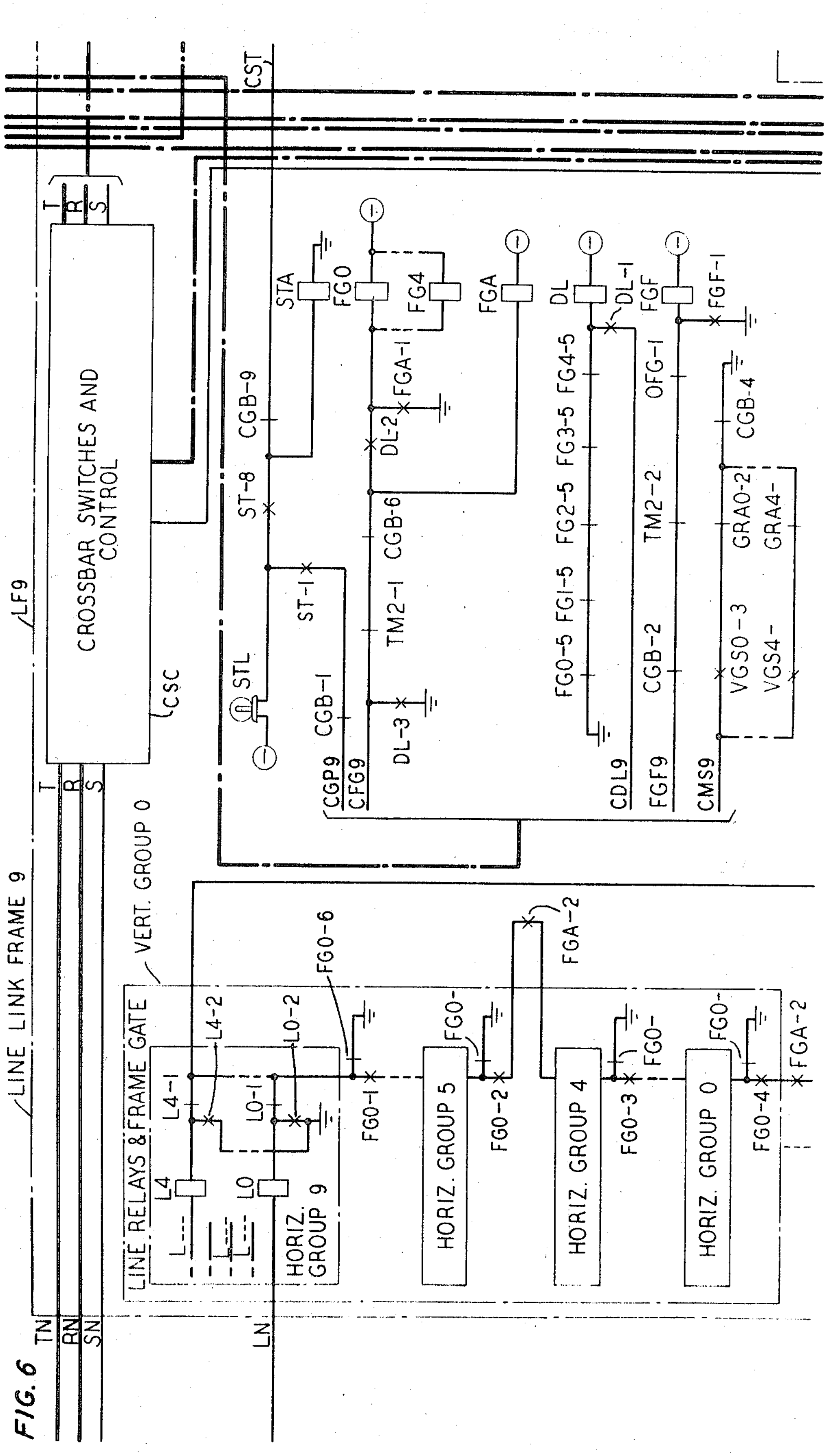
FIGS. 6 through 9 illustrate line link frame and line link and marker connector control circuits.
Figure 7:
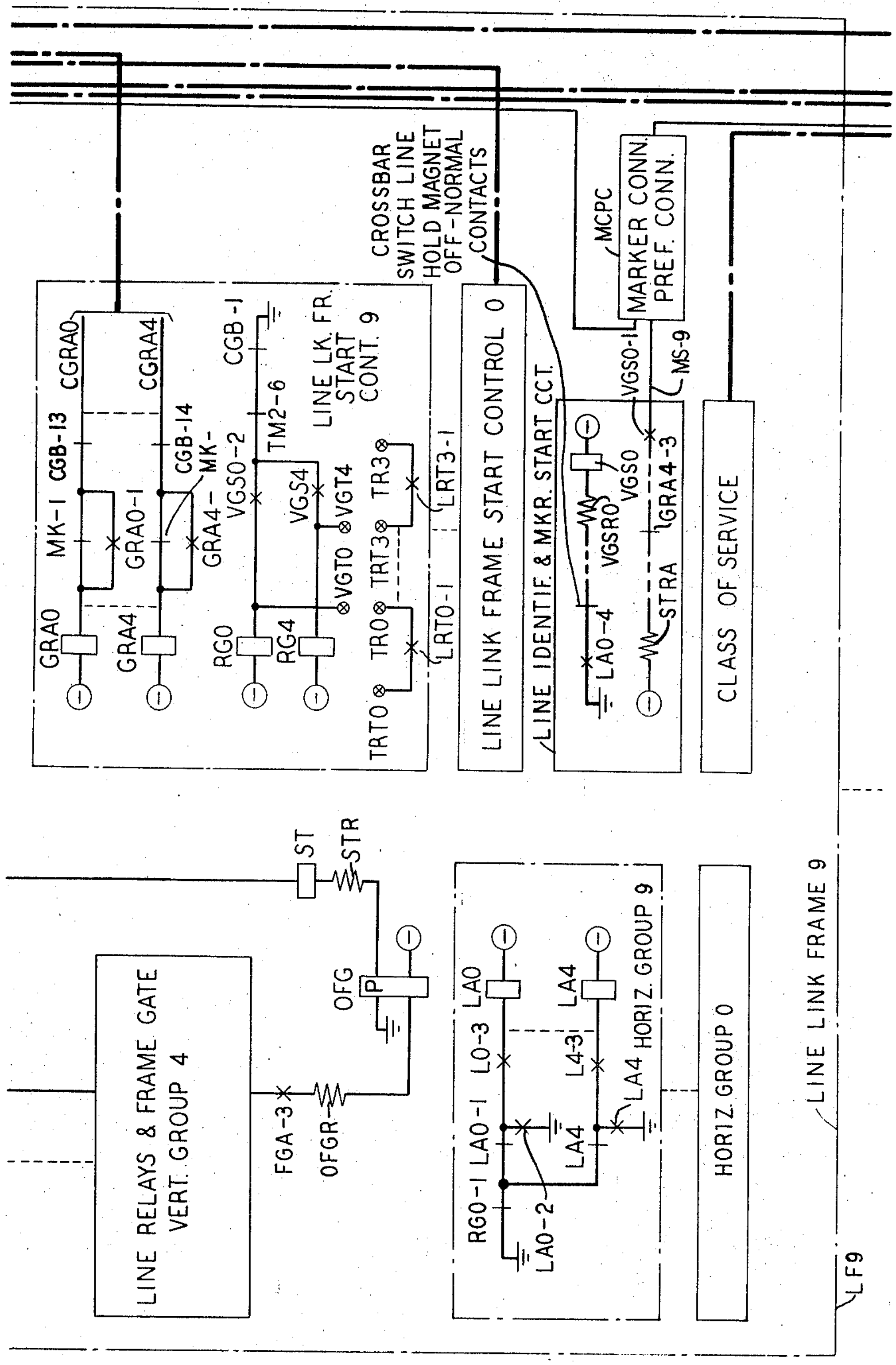
Figure 8:
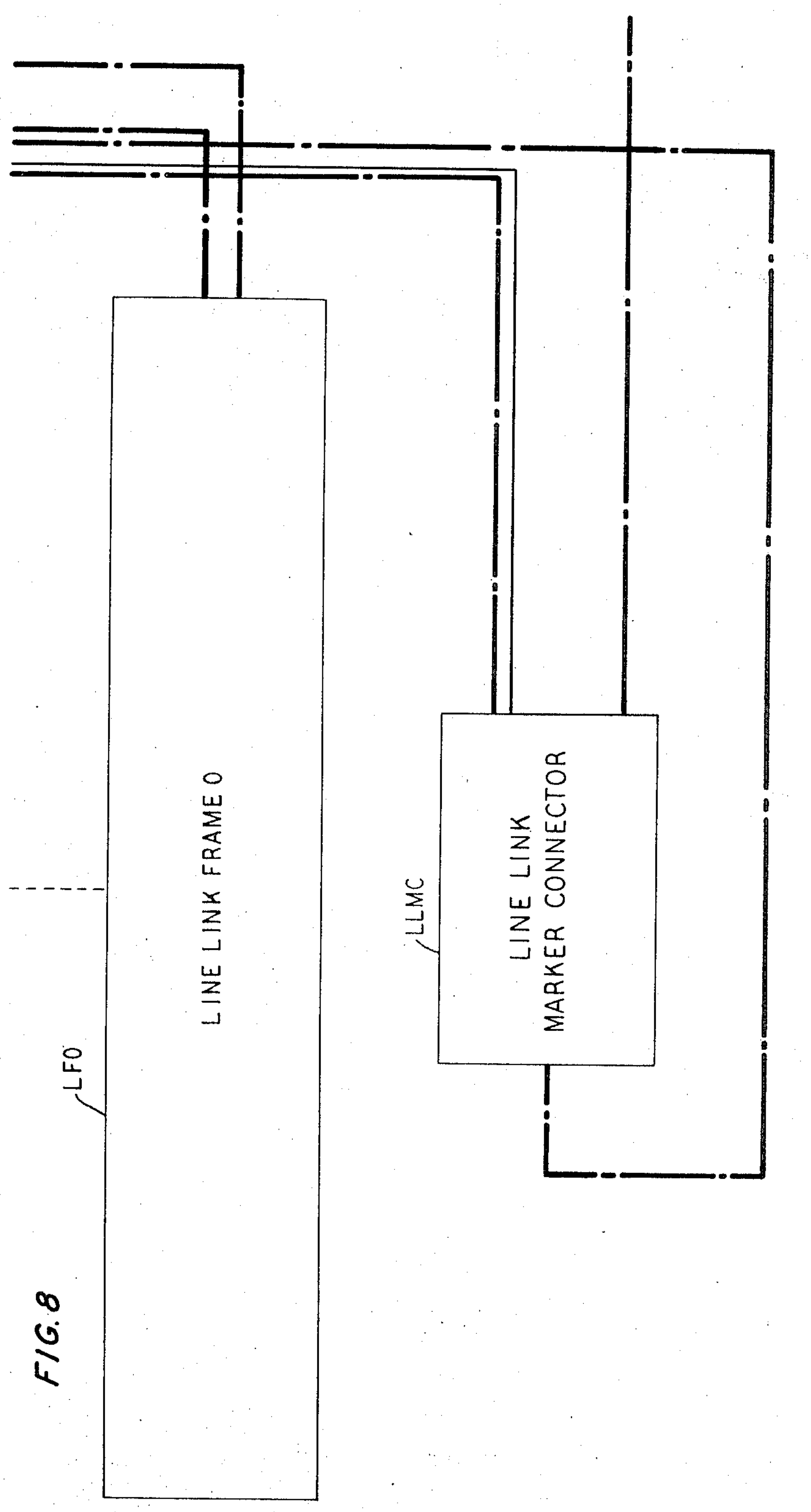

The following description is directed to the line link frame LF9 inasmuch as the other frames LFO–LF8 are essentially the same in equipment and operation. Varied switching patterns and cross-connections can be made on a particular line link frame by known techniques to accommodate and serve one to five of the different classes-of-incoming calls.

a. Frame Gate (FIGS. 6 and 7)

The frame gate on link frame LF9 comprises the relays FGO–FG4 and FGA. Contacts of these relays control the operation of line relays, such as relays LO–L4, and a start relay ST for registering line circuit requests and initiating frame starts to the gate control circuit FPGC of FIGS. 10–13. Prior to the receipt of any service requests, relay FGA is operated under control of a master gate relay MG9 (FIG. 12) of circuit FPGC. The operate path is from the FGA relay winding through contacts CGB–6 and TM2–1, conductor CFG9 and contact MG9–1 in FIG. 12 to ground. In operating, relay FGA operates relays FGO–FG4 via contact FGA–1 to ground for preparing the start relay ST to detect service requests on frame LF9. Prior to describing such requests, it is advantageous to explain that the start relay ST is serially connected with contacts of the frame gate relays and with an open and false ground detecting relay OFG. Under the idle conditions, relay OFG is operated in a circuit from its upper winding through resistor STR, the winding of relay ST, and operated contacts FGO–1 through FGO–4, FGA–2, and FGA–3, resistor OFGR and a lower winding of relay OFG. The latter relay is a polar device which, in the series arrangement, is forward biased on its upper winding and reverse biased on its lower winding to cause its operation. Relay OFG releases when an open or a false ground appears anywhere in the described series circuit. In releasing, relay OFG causes the operation of a frame gate failure relay FGF via contacts OFG–1, TM2–2 and CGB–2, conductor FGF9 and a master gate relay contact MG9–2 of FIG. 12. Upon operating, relay FGF locks via its contact FGF–1, provides a suitable maintenance alarm (not shown), and operates relay CGA of FIG. 9 via contact FGF–2 for canceling frame gate operations until the open or false ground is cleared.

In the absence of a false ground or open and during the time that no request is presented to frame LF9, relays OFG is operated and relay ST is released. A line circuit terminated on frame LF9 presents a service request by a negative potential on the associated conductor L–. Illustratively, a service request from line circuit LCn appears as a negative potential on conductor LN. One or more such requests from line circuits causes the operation of start relay ST. For example, a request from circuit LCn causes the operation of relay ST by applying a negative potential through the winding of the line relay LO and its contact LO–1. The current flow thus produced through relay LO is insufficient for operating it at this time.

The operation of relay ST initiates a start from frame LF9 which competes with starts from other of the frames LFO–LF8 for inclusion in the next gate cycle generated by control circuit FPGC. Operated relay ST, in turn, operates a gate preference relay GP9 of FIG. 12 over a path via contacts MG9–3, GCS9–1, MS9–1, GCE3–1, conductor CGP9, contacts CGB–1 and ST–1, and a resistance lamp STL to negative potential. The released state of the GCE3 and GCSO relay contacts in the latter path indicates that no gate cycle is in progress and the MS9 relay released indicates that there is no marker start being presented by frame LF9.

Figure 12:
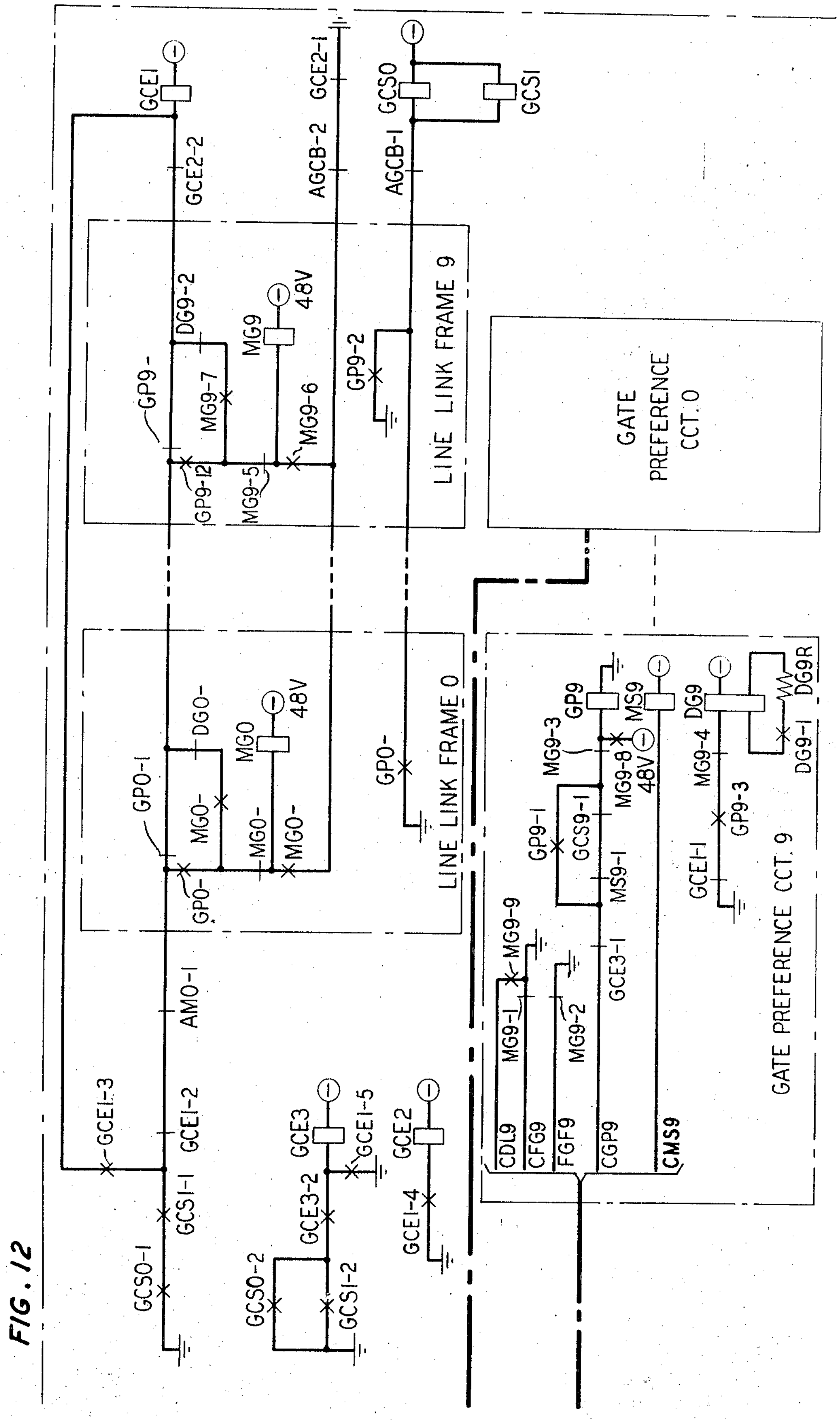

Upon operating, relay GP9 locks via its contact GP9–1. It also operates a delay gating relay DG9 of FIG. 12 via contacts MG9–4, GP9–3 and GCE1–1 and the gating cycle start relays GCSO and GCS1 of FIG. 12 via contacts GP9–2 and AGCB–1. Relays GCSO and GCS1 are sufficiently slow in operating to ensure that all concurrent line link frame starts operate their respective gate preference relays (for example contact GCSO in the operate path of relay GP9). A line link frame starts arriving after the operation of relays GCSO and GCS1 must therefore wait for inclusion in the next gate cycle.

b. Line Link Master Gate Preference and Control Circuit (FIG. 12)

The master gate preference circuit comprises the relays MGO–MG9, each of which is associated with a respective one of the gate preference relays GPO–GP9 to provide for the serving of one of the line link frames LFO–LF9 at a time. A preference is illustratively established by contact configurations of the GPO–GP9 relays to afford the line link frame LFO the highest preference and frame LF9 the lowest preference whereby the frames are served in the order LFO to LF9.

When the gate cycle start relays GCSO and GCS1 operated as explained for the service request from link frame LF9, the master gate relay MG9 is operated provided that no higher preferred one of the link frame LFO–LF8 concurrently requests service. Relay MG9 operates in a path from its winding through contacts MG9–5, GP9–12, contacts (not shown) of intermediate relays GP1–GP8, and the contacts GPO–1, AMO–1, GCE1–2, GCSl–1 and GCSO–1 to ground. In operating, relay MG9 locks via contacts MG9–6, AGCB–2, and GCE2–1 to ground. The operation of relay MG9 locks relay GP9 operated via contact MG9–8 and concurrently effects the momentary opening of the frame gate for link frame LF9 for a time delay interval which determines the sequential advance of service among line link frames and the end of the gate cycle.

Relay MG9 effects the opening of the frame gate for frame LF9 by causing the release of relay FGA of FIG. 6 upon the opening of its previously described operate path at contact MG9–1. In releasing, relay FGA causes the release of relays ST, OFG and FGO–FG4 of FIGS. 6 and 7 by opening contact FGA–3 and FGA–1. The release of relays FGO–FG4 completes a path for enabling all service requesting line circuits on frame LF9 to operate their associated line relays such as relay LO of FIG. 6 for line circuit LCn. The latter relay operates in the path from the negative potential on conductor LN via the LO relay winding and the contacts LO–1 and FGO–6 to ground. Relay LO immediately locks via its contact LO–2 to ground. The operate and lock paths for other line circuits are essentially the same as those for relay LO of vertical group O, horizontal group 9.

The frame gate remains open only for a short period of time as determined by the operate time of relay DL of FIG. 6 following the release of relays FGO–FG4. During the latter time, all line circuits requesting service must operate their associated line relays to obtain service during the current gate cycle. Relay DL operates via contacts FG4–5 through FGO–5 to ground and immediately locks via contact DL–1, conductor CDL9 and contact MG9–9 of FIG. 12. Upon operating, relay DL reoperates relays FGA and FGO–FG4 to reclose the frame gate on frame LF9 and thereby to reoperate relay OFG as previously explained. Relays FGA and FGO–FG4 operate via contacts DL–2, CGB–6, TM2–1 and DL–3 to ground and then subsequently lock operated via contact FGA–1.

While the immediately foregoing operations are in progress and upon the operation of relay MG9, a delay gate relay DG9 of FIG. 12 is released by the opening of contact MG9–4. Relay DG9 releases slowly in part due to its lower winding being terminated with an actuated contact DG9–1 and resistor DG9R to provide a timed delay interval for ensuring that a marker start resulting from the ungating, or opening, of the frame LF9 is registered and counted before the next service requesting line link frame is ungated. Following the release of relay DG9, the gate cycle end relay GCE1 is operated via contacts GCE2–2, DG9–2, MG9–7, GP9–12 and GPO–1, contacts of intermediate relays GP1–GP8, contacts AMO–1, GCE1–2, GSC1–1 and GCSO–1 to ground. In operating, relay GCE1 operates relay GCE2 via contact GCE1–4 for, in turn, effecting the release of all operated master gate relays by opening contact GCE2–1. Upon releasing, relay MG9 opens the locking path for relay DL of FIG. 6 at contact MG9–9 of FIG. 12 and locks relay FGA operated over the previously described path. Operated relay GCE1 also operates relay GCE3 via contact GCE1–5 which then locks via contacts GCE3–2 and a parallel combination of GCSO–2 and GCS1–2 for opening all gate preference conductors CGPO–CGP9 from line link frames LFO–LF9. Illustratively, conductor GCP9 for frame LF9 is opened at contact GCE3–1. Upon the release of relay MG9 and the opening of conductor CGP9, relay GP9 releases for, in turn, causing the release of relays GCSO and GCS1 by opening contact GP9–2 and relay GCE1 by the opening of contacts GCSO–1 and GCS1–1. The release of relay GCE1 opens its contacts GCEL–4 and GCE1–5 to effect the release of relays GCE2 and GCE3 and thereby terminating the gate cycle.

c. Route Gate (FIG. 7)

Frame gating as already explained provides for the bulk admission of line circuit service requests for registration on respective line relays of all line link frames at the start of a frame gate cycle under control of the frame and position gate control circuit FPGC. Once admitted beyond the frame gate, the registered service requests are subjected to further gating by routes, or classes, to ensure that calls of each class are served in the approximate order in which they are received. Such route gating is advantageous because a registered service request may be awaiting service at the expiration of a frame gate cycle and it is desirable to serve such a request before subsequently registered service requests of the same class admitted during another frame gate opening at the beginning of a succeeding frame gate cycle.

For automatic call distributor operation, access to a route through the line link and trunk link frame network is determined by the assignment of the line circuits LC1–LCn within particular vertical groups on respective ones of the line link frames LFO–LF9. The number of routes, or classes, is selectable for example from one to five in the illustrative embodiment and corresponds to the number of different classes-of-calls served by operators. In the exemplary embodiment, one or more vertical groups are assignable to the same route by cross-connections between the vertical group terminals VGTO–VGT4 associated with five route gate relays RGO–RG4 of FIG. 7.

Each of the route relays RGO–RG4 is associated with both an individual one of the five routes and an individual one of the five vertical groups on a line link frame. A route gate relay is operated as later explained when a vertical group start occurs for selecting an idle one of the markers MO–M4. In operating, a route gate relay opens its contacts in the operate paths of associated line auxiliary relays, such as relays LAO–LA4, in all associated crossbar switch horizontal groups for blocking further line auxiliary relay operations until all the registered service requests of that route are served.

Figure 10:
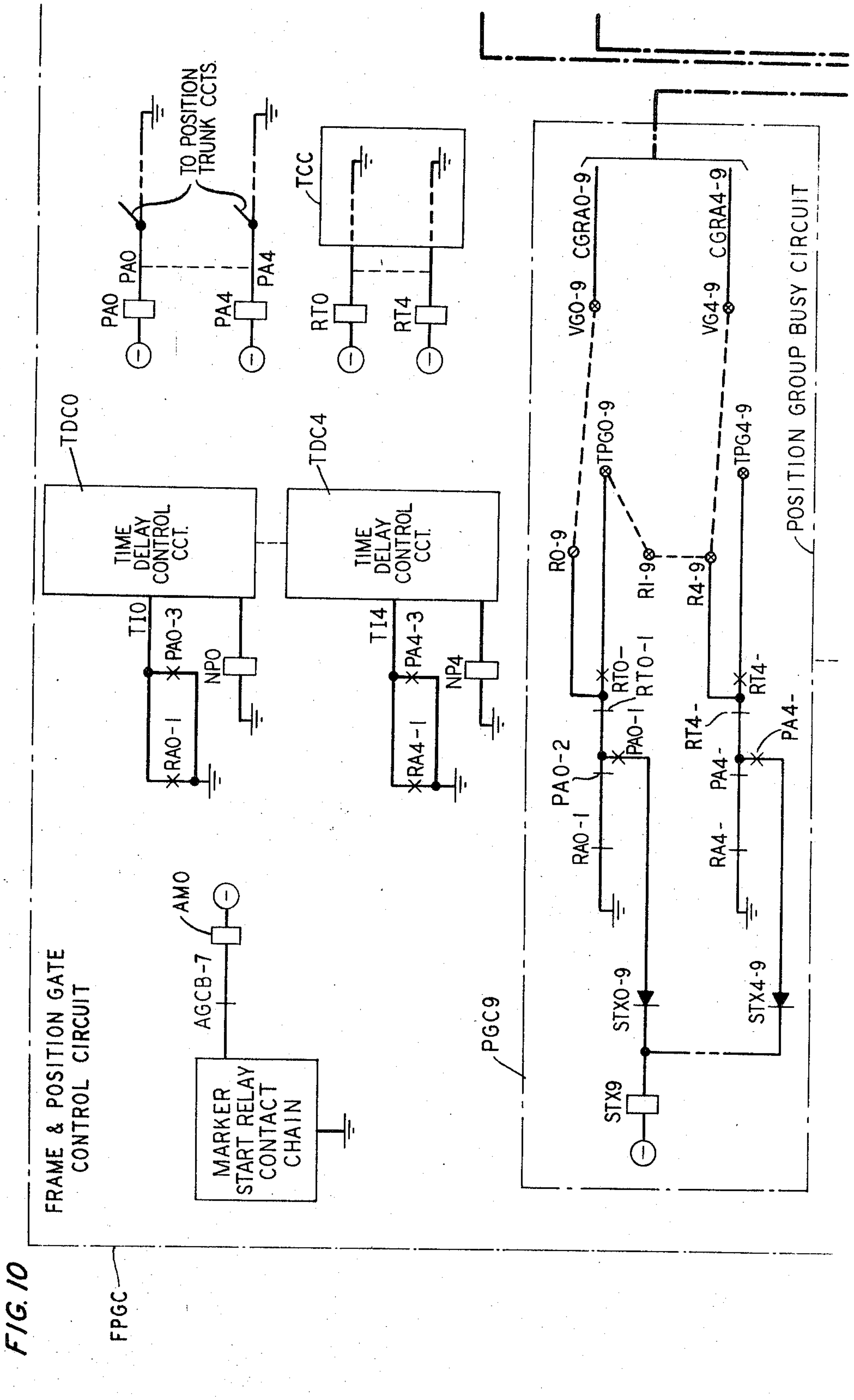
FIGS. 10 through 13 show a frame and position gate control circuit.

Each of the horizontal groups O–9 on a line link frame comprise line auxiliary relays LAO–LA4 for the respective line relays LO–L4 of the same horizontal group. The operate paths of the auxiliary relays LAO–LA4 are controlled by one of the route gate relays RGO–RG4 assigned to the respective vertical group. Illustratively, the relays LAO–LA4 of horizontal group 9 are controlled by the RGO relay contact RGO–1. When relay LO operated as priorly described for the service request from line circuit LCn, it partially completed a path for operating the auxiliary relay LAO via contact LO–3. If relay RGO is operated for indicating that a prior request is awaiting service, the route gating is effective to block the operation of line auxiliary relays associated with that route and the service requesting call on line circuit LCn must wait until priorly admitted calls in that routed are connected to operators. On the other hand, when relay RGO is released for indicating that no registered request is awaiting connection to an operator, the operate path for the auxiliary line relay LAO is completed via contacts LO–3, LAO– 1 and RGO–1 to ground. In operating, relay LAO locks via contacts LO–3 and LAO–2. The operation of relay LAO also causes the operation of a vertical group start relay VGSO, for initiating calling line circuit identification and marker start operations. Relay VGSO operates via a resistor VGSRO, a conventional off-normal contact on a crossbar switch hold magnet associated with line circuit LCn, and a contact LAO–4 to ground. In operating, the vertical group start relay, for example relay VGSO, activates the associated route gate relay, for example relay RGO, to close that route gate by opening the respective route gate relay contacts in the operate path for the associated line auxiliary relay, for example relay LAO. Illustratively, relay RGO operates via contacts VGSO–2, TM2–6 and CGB–1 to ground and thereupon closes the route gate to insure that subsequently arriving calls to the same route are not served before earlier arrivals.

d. Position Gating (FIGS. 6 and 10)

The initiation of calling line identification and marker start operations are further controlled by the gate control circuit FPGC in accordance with the availability of operator positions to serve the particular class-of-call requesting service. Relays PAO–PA4 monitor the availability of operator positions to serve all classes-of-calls. Each of the relays PAO–PA4 is associated with an individual one of the classes-of-call and all operator positions trunks serving the same class-of-call are connected to the same one of the PAO–PA4 relays. Position trunk gating is employed to preclude the markers from being engaged in an attempt to establish connections for a calling line circuit when no operator position is available for serving the call. This reduces the number of premature switching functions by markers and associated peripheral circuits and frees them for switching other calls to available operator positions.

Relays PAO–PA4 control operator group availability relays GRAO–GRA4 on each of the line link frames LFO–LF9 to provide for the gating of calling line circuit identification and marker start operations in accordance with operator availability. Relays GRAO–GRA4 are operated under control of a contact configuration of relays PAO–PA4, RAO–RA4 and RTO–RT4 and cross-connections between route and vertical group terminals RO–0 through R4–9 and VGO–0 through VG4–9. The latter cross-connection field associates each vertical group in the line link frames LFO–LF9 with the particular route, or class-of-call, to which it is assigned. Illustratively, the last numeral of a route terminal designation identifies the line link frame with which it is associated and the first numeral indicates the particular route class. For example, terminal RO–9 indicates that it is associated with frame LF9 and route class O. Similarly, the last numeral of the vertical group terminals indicates the line link frame with which it is associated and the first numeral indicates the vertical group on that frame which is associated with a particular route class by cross-connections. To elaborate, there are five vertical group and five route terminals in each of the position group busy circuits PGCO–PGC9 which correspond to a respective one of the frames LFO–LF9.

Individual ones of the relays PAO–PA4 are released when no operator position is available for connection to the class-of-call associated with that relay. Under the latter condition, the connected position trunks disconnect operating grounds from the respective ones of the PAO–PA4 relay windings. In releasing, the respective PAO–PA4 relay causes the operation of an associated one of the group availability relays GRAO–GRA4 on all of the frames LFO–LF9. Illustratively, when relay PAO is released, the LF9 frame relay GRAO of FIG. 7 is operated to block the initiation of line identification and marker start operations. Relay GRAO operates via contacts MK–1 and CGB–13, conductor CGRAO, cross-connections of terminals VGO–9 and RO–9, and contacts RTO–1, PAO–2 and RAO–1 to ground. In operating, relay GRAO locks via its contact GRAO–1 in parallel with contact MK–1. The operation of relay GRAO opens at contact GRAO–2, the marker start conductor CMS9 to the gate control circuit FPGC to block the operation of relay MS and, importantly, to open the marker start conductor MS–9 at contact GRAO–3 to block further processing of the call until an operator becomes available.

When a position trunk is available, it causes the operation of the connected one of the PAO–PA4 relays over the obvious path to indicate that at least one operator position is available for serving the associated class-of-call. Upon operating, a relay PAO–PA4 effects the release of its controlled ones of the GRAO–GRA9 relays on all frames LFO–LF9 by opening its contacts in the circuits PGCO–PGC9. During the operated states of the PAO–PA4 relays, a standing test for false ground in the cross-connection field is made in a conventional manner under control of an associated one of the relays STXO–STX9 to ensure that such a trouble condition does not interfere with position gating in such a way as to operate the group availability relays GRAO–GRA9 on line link frames. Illustratively, when relay PAO is operated, the winding of relay STX9 is connected via diode STXO–9 and contacts PAO–1 and RTO–1 to terminal RO–9 for testing for a false ground.

Returning now to the progress of the call on line circuit LCn and assuming that an operator position is available for serving the call, a line identification and marker start operations are immediately initiated following the actuation of relay VGSO as explained already by applying a negative potential to conductor MS–9 via contacts VGSO–1 and GRAO–3 and resistor STRA. In response to the potential on conductor MS–9, the marker connector and preference control circuit MCPC of FIG. 7 causes an available one of the markers MO–M4 to be engaged by frame LF9 for identifying line circuit LCn in a manner as described in the Busch patent beginning in column 6, line 50 et seq., preparatory to the selection and establishment of connections through the line and trunk link frame network to an available operator position.

A marker start is also registered in gate control circuit FPGC by the operation of relay MS9 of FIG. 12 following the operation of relay VGSO and via conductor CMS9, contacts VGSO–3, GRAO–2 and CGB–4 to ground. Contacts of marker start relays MSO–MS9 of FIG. 12 are configured in a conventional symmetric to control the operation of an all markers busy relay AMO of FIG. 10. When the number of line link frame starts for markers equals or exceeds the number of markers, relay AMO operates under control of the marker start relay contact configuration and contact AGCB–7 for momentarily interrupting the ungating of line link frames LFO–LF9 until the number of marker starts are less than the number of markers.

The operation of relay AMO opens the MGO–MG9 master gate relay operate paths at contact AMO–1 to prevent all other line link frames with no marker starts from becoming ungated at the frame gates during the all markers occupied period. When the number of line link frame marker starts becomes less than the number of markers, as evidenced by the release of relay AMO, ungating of line link frames at the frame gates continues. The operation of relay AMO can occur at any time whether or not a gate cycle is in progress and always inhibits the ungating of additional line link frames by opening its contact AMO–1 in the master gate preference chain of FIG. 12. However, the operation of a marker start relay does not inhibit the ungating of a line link frame if it has already entered a gate cycle as evidenced by the operation of its group preference relay.

e. Position Availability Timing (FIGS. 10 and 13)

Gate control circuit FPGC is equipped with facilities which time the period during which operator positions serving each of the five different route groups, or classes-of-call, are busy. The timer facilities are effective to cancel the position gating for a specific route when all trunks associated with that route to a group of operators serving the associated class-of-call are all busy for a prescribed time period.

As shown in FIG. 10, time delay control circuits TDCO–TDC4 are furnished for the five route, or class, groups. Each of the circuits TDCO–TDC4 is associated with an individual one of the routes for timing the period after all associated position trunks become busy. Circuits TDCO–TDC4 are basically timing circuits which are responsive to the removal of a ground from the respective TIO–TI4 conductor under control of contacts on routes available and position available relays RAO–1 through RA4–1 and PAO–3 through PA4–3 for generating a timing interval at the end of which the respective relay NPO–NP4 is operated.

Figure 13:
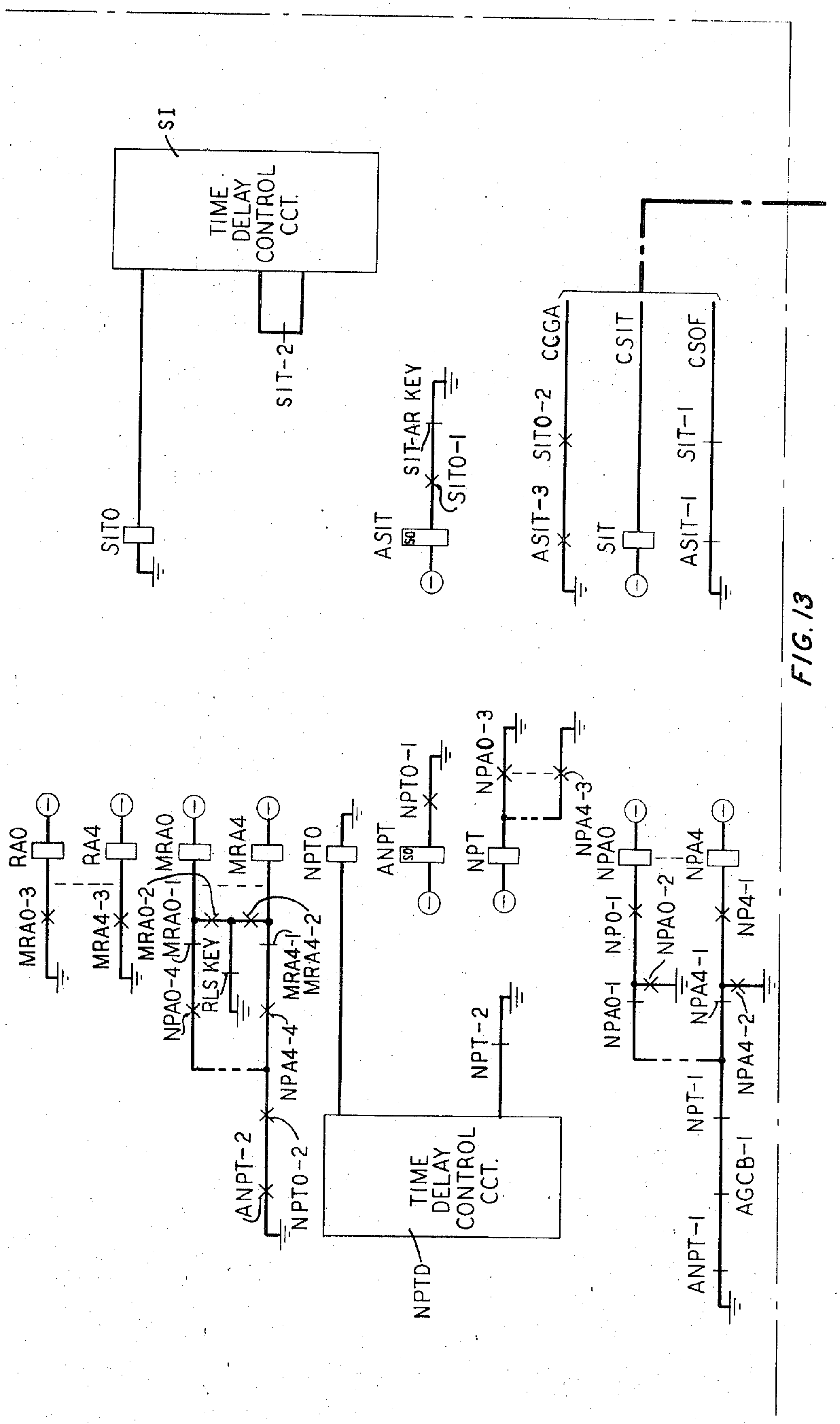

Each of the relays NPO–NP4 cooperate with auxiliary relays NPAO–NPA4 of FIG. 13 to control on a one-at-a-time basis a no positions time delay control circuit NPTD which is shared by all routes and times the period that each of the routes is busy. If a route should remain busy for a predetermined period following the initial period by a TDCO–TDC4 circuit, the NPTD circuit times-out and initiates circuit actions which release the GRAO–GRA4 relay (FIG. 7) associated with that route on each of the line link frames. The latter action cancels position gating for all of the frames LFO–LF9.

Following the operation of an NPO–NP4 relay, the associated NPAO–NPA4 relay is operated. Illustratively, when relay NPO operates relay NPAO operates via contacts NPO–1, NPAO–1, NPT–1, AGCB–1 and ANPT–1 to ground. In operating, relay NPAO locks via contact NPAO–2. The operation of relay NPAO operates a no position timing relay NPT via contact NPAO–3. Upon operating, relay NPT opens its contact NPT–1 to preclude the operation of the relays NPA1–NPA4 until relay NPT again releases. Operated relay NPT also opens its contact NPT–2 to initiate timing by circuit NPTD. If an operator position associated with the route O becomes available during the timing by circuit NPTD, relay PAO recloses its contact PAO–3 to recycle circuit TDCO and thereby to release relay NPO. The latter action causes relay NPAO to release upon the opening of contact NPO–1. Released relay NPAO deactivates relay NPT which, in turn, recycles circuit NPTD by opening contact NPT–2. On the other hand, if a trouble exists and relay NPAO remains operated, it is attributed to route O position trunks none of which have become available during the timing interval generated by circuit NPTD. Following the expiration of the latter interval, relay NPTO operates and, in turn, operates auxiliary relay ANPT over the obvious path for effecting the alerting maintenance personnel to the trouble in a conventional manner. Operated relay ANPT also opens its contact ANPT–1 to block operations of other NPA1–NPA4 relays. Relay ANPT also activates a "make route O available" relay MRAO over the path through contacts MRAO–1, NPAO–4, NPTO–2 and ANPT–2 to ground. Activated relay MRAO locks via contact MRAO–2 and a release key RLS. Relay MRAO also operates a relay RAO via contact MRAO–3. The latter operation effects the recycling of time delay control circuit TDCO by closing contact RAO–1 to release relay NPO, which in turn releases relays NPAO, NPT, and NPTO and recycles circuit NPTD. In operating, relay RAO also opens its contact RAO–1 to release the relays GRAO on all frames LFO–LF9 for canceling position gating for route O calls until release key RLS is momentarily actuated following a clearance of the trouble.

f. Frame Gate Interval Timing (FIG. 11)

A gate time delay control circuit GTD times each frame gate cycle, that is, the interval of time from the operation of one of the gate preference relays GPO–GP9 of FIG. 12 until the release of the gate cycle end relay GCE3. When a GPO–GP9 relays operates, it opens the respective contact GPO–5 through GP9–5 to remove ground from conductor CG for initiating timing by circuit GTD. If the frame gate cycle exceeds a defined time period, circuit GTD times-out and operates relay GITO. The latter operation causes the activation and locking of the alarm gate relay AGIT via contacts GITO–1 and AGIT–1 and key RLS–1.

The operation of relay AGIT also operates relay AGCB via contacts AGIT–3 and AMTC–1. In operating, relay AGCB releases operated ones of the relays GCSO, GCS1, CGE1, MGO–MG9 and AMO and opens the operate paths of relays NPA1–NPA4. In operating, relay AGIT opens contact AGIT–2 to effect the release of the normally operated relay CGRL which, upon releasing, initiates the cancellation of all frame gating by closing contacts CGRL–1 to CGRL–9 to operate the cancel gate relays CGB on each of the frames LFO–LF9. Each of the latter relays in operating cancels frame gating on all line link frames by opening contacts in strategic paths for controlling frame gate operation. Illustratively, the CGP9 conductor on frame LF9 is opened at contact CGB–1 to block gate preference relay operation and the frame gate relays FGA and FGO–FG4 control paths are opened at contact CGB–6 to cancel frame gate operations. The latter relays thereafter release for allowing service requests on all frames to be registered on the line relays as already explained.

Figure 11:
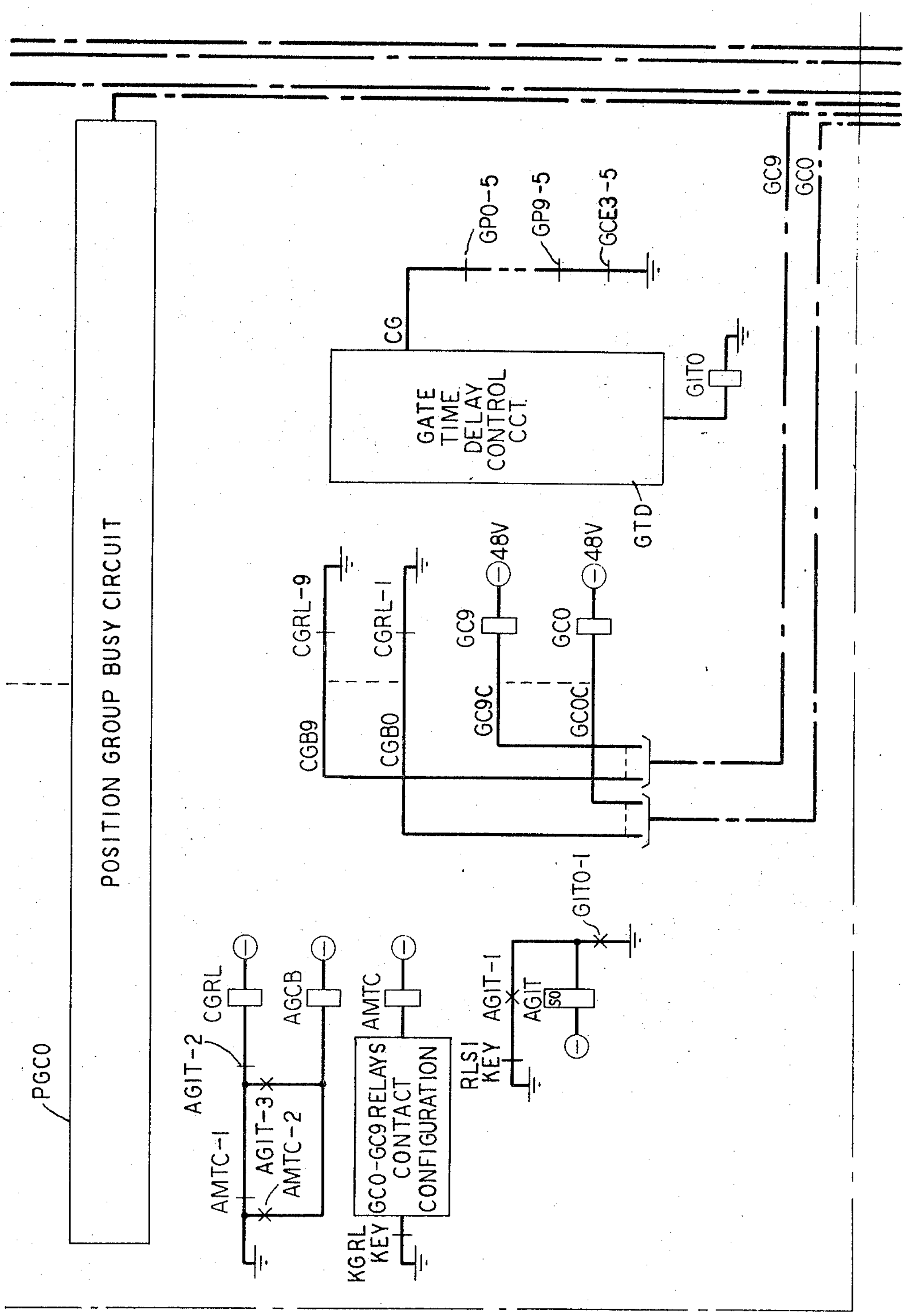

The operation of relays CGB on all of the line link frames causes the operation of the gate canceled relays GCO–GC9 of FIG. 11. Illustratively, relay GC9 is operated via conductor GC9C and contact CGB–7 of FIG. 9 to ground. After all of the GCO–GC9 relays are operated, relay AMTC operates for further controlling the operation of relay AGCB via contact AMTC–2.

Figure 9:
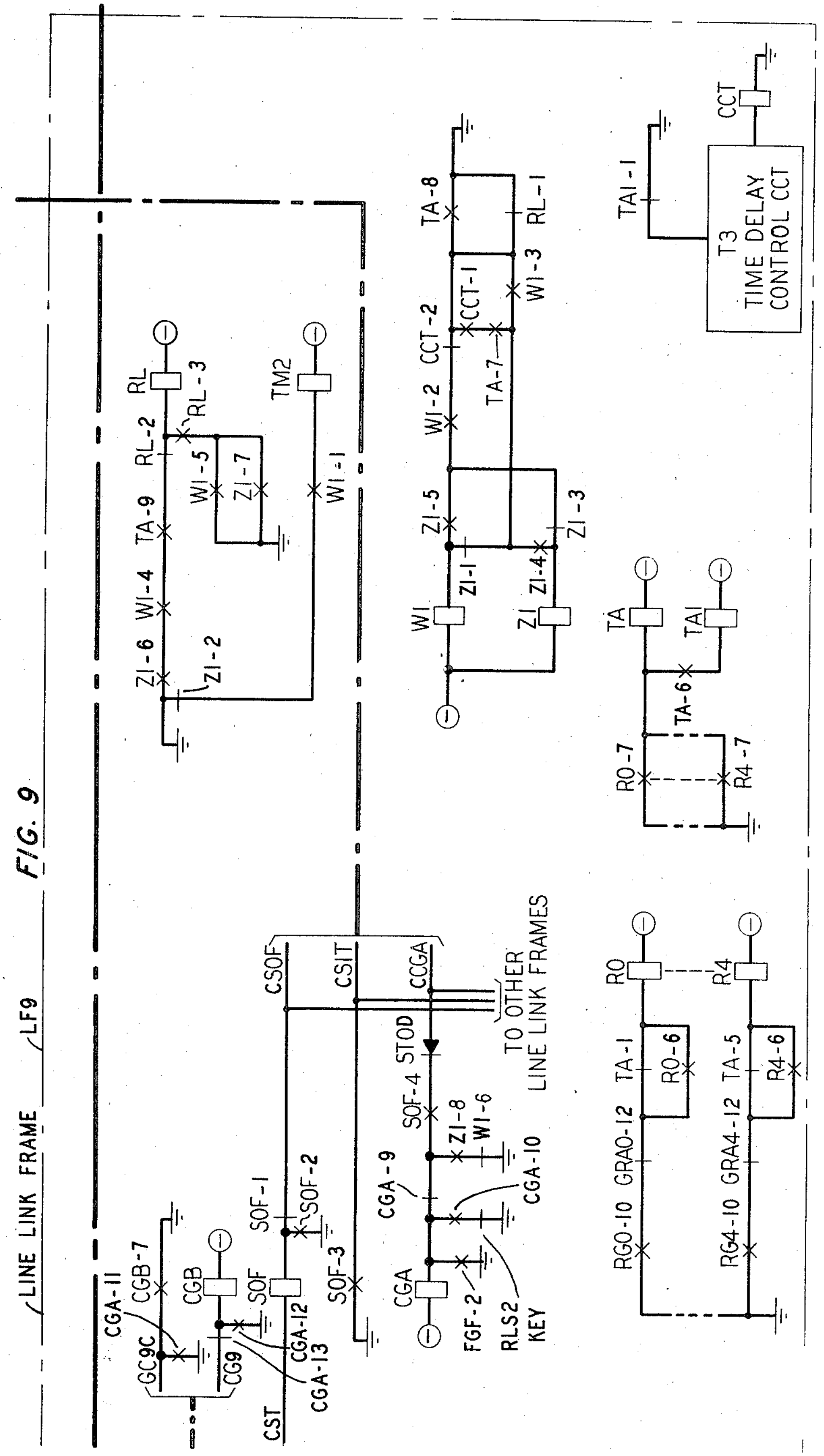

Relay AGIT is subsequently released by the momentary operating of key RLSI. The release causes a silencing of a conventional alarm provided by the operation of relay AGIT; however, operated relay AMTC holds relay CGRL released and AGCB operated under control of its contacts AMTC–1 and AMTC–2. Relay AMTC is released following a clearing of the frame gating trouble and in response to the momentary operation of key KGRL. Normal frame gating is resumed when relay AMTC releases and effects the reoperation of relays CGRL and the release of relay AGCB.

g. Start Interval Timing (FIGS. 9 and 13)

A start interval time delay control circuit SI of FIG. 13 is common to all line link frames and times the interval from the operation to the release of a start relay ST (FIG. 7) on each such frame. This action monitors the interval from the initial receipt of a service request on a line link frame until the frame gate is opened to register the service request. If a start on the frame persists beyond a designated period, the SI circuit times-out and initiates actions which cancel the frame gating on that frame for thereafter enabling any service request on the frame to operate its line relay. The timeout also provides conventional alarms for maintenance personnel.

Referring to line link frame LF9 for illustration, relay ST of FIG. 7 is operated upon the receipt of a service request as priorly described. In operating, relay ST causes the operation of its auxiliary relay STA of FIG. 6 via contact ST–8 and lamp STL. Operated relay ST also causes the operation of the start-on frame relay SOF of FIG. 9 provided that the start interval timing circuits are available for timing the frame start. Relay SOF operates via conductor CST, contacts CGB–9 and ST–8, and lamp STL as well as via contact SOF–1, conductor CSOF, and contacts SIT–1 and ASIT–1 to ground. Upon operating, relay SOF locks via its contact SOF–2. Operated relay SOF also closes its contact SOF–3 for causing the operation of relay SIT of FIG. 13 which, in turn, opens its contact SIT–2 for commencing the start interval timing by circuit SI. Any of the frames LFO–LF9 having registered starts then have their SOF relays concurrently operated for the timing operation, and as such frames are ungated, their respective SOF relays release.

If there is trouble, it is attributed to a line link frame with a start which has not been ungated during the SI circuit timing. In that case, both the ST and SOF relays for that frame remain operated. Upon timeout, circuit SI operates relay SITO which, in turn, operates relay ASIT via contact SITO–1 and a release key SIT–AR. The latter operation causes conventional alarms to be produced for maintenance personnel. In addition, it operates the cancel gate relay CGA (FIG. 9) on the line link frame causing the timeout and via a path through contacts CGA–9 and SOF–4, diode STOD, conductor CCGA, and contacts SITO–2 and ASIT–3 to ground. Relay CGA then locks via contact CGA–10 and release key RLS2. The operation of relay CGA of FIG. 9 causes the operation of relay GC9 of FIG. 11 via conductor GC9C and contact CGA–11 to ground. Operated relay CGA also operates relay CGB to disable frame gating on frame LF9 by opening contacts in strategic control paths in a manner as priorly described. When frame gating is disabled, relays ST and SOF are released. The released relay SOF releases relay SIT by opening contact SOF–3 and relay SIT then recycles the start interval control circuit SI which results in the release of relay SITO.

A momentary actuation of key SIT–AR effects the release of relay ASIT for enabling control circuit SI to be used for timing starts on other line link frames. Relays CGA and CGB remain operated during the interval that frame gating is cancelled on frame LF9 and until key RLS2 is momentarily operated. Accordingly, service requests on frame LF9 proceed directly to bid for an idle one of the markers MO–4 without frame gating, but with route and position gating.

It is advantageous to explain that if frame gating on two or more line link frames is cancelled in a manner as just explained, frame gating for all of the remaining frames is cancelled. When two or more of the cancel gate relays CGO–CG9 are operated, as priorly explained, relay AMTC is operated for releasing relay CGRL and operating relay AGCB to cancel frame gating on all frames LFO–LF9 as already described with respect to the gate interval timing operations of circuit FPGC.

h. Call Completion Timing (FIG. 9)

A time delay control circuit T3 times the interval from the entry into a route gate of one or more requests until all calls are cleared out of that gate. If a service request is blocked in a route gate due to a trouble, for example, in a line circuit, an associated channel through the line and trunk link frame network, or in a frame gate, or in a route gate, it would cause the respective one of the route gate relays RGO–RG4 of FIG. 7 to remain operated for an abnormal length of time and deny service to the associated class-of-call on the line link frame. Troubles causing such a condition are usually detected by a marker in a conventional manner, but the function of the T3 control circuit is primarily to restore the operation of the route gate so that other calls may be served. Thus, circuit T3 times for a specified period and, upon timeout, the frame and route gates are released to allow additional requests for service into the route gates.

Thereafter, the frame and route gates are closed and control circuit is recycled for the immediate initiation of a second timing interval. If the service request which caused the first timeout is still in the route gate and is served satisfactorily, during the second timing interval the trouble was temporary, such as a failure to find a channel. However, if the trouble persists, a second timeout occurs for cancelling gating on the frame and providing an alarm to maintenance personnel.

Call completion timing functions are started following the operation of an appropriate one of the route gate relays RG0–RG4 as previously explained. The operation of the latter relay operates its respective one of the RO–R4 relays of FIG. 9. Illustratively, relay R0 operates via contacts TA–1, GRA0–12 and RG0–10 and then locks via contact R0–6 which bridges contact TA–1. In operating, relay R0 operates relay TA via contact R0–7 which, in turn, operates relay TA1 via contact TA–6. The operation of relay TA locks-out other of the routes from entry into the timing cycle by opening contacts TA–1 to TA–5. Upon the operation of relay TA1, contact TA1–1 opens to initiate timing by control circuit T3.

A WZ relay combination is provided to count the first and second timeouts. With relay TA operated and a first timeout by circuit T3, relay CCT operates for causing the operations of relay W1 followed by the operation of relay TM2. Relay W1 operates via contacts Z1–1, TA–7, CCT–1 and TA–8 to ground. Relay TM2 operates via contacts W1–1 and Z1–2 to ground. The operation of relay TM2 opens its contacts to effect the release of the route gate relays RO0–RG4 and frame gate relays FGA and FG0–FG4 which allow new calls to enter the gates. The release of relays RG0–RG4 causes the successive release of the respective relays R0–R4, TA and TA1 to deactivate control circuit T3 for causing the release of relay CCT. When the latter occurs, relay Z1 operates via contacts Z1–3, W1–2, CCT–2 and RL–1 to ground. Upon operating, relay Z1 locks via contacts Z1–4 and W1–3.

The operation of relay Z1 provides a holding path for relay W1 via contacts Z1–5, W1–2, CCT–2 and RL–1 to ground. Operated relay Z1 also opens its contacts Z1–2 to release relay TM2 for allowing the frame and route gates to close again in response to service requests and under control of relays FGA, FG0–FG4 and RG0–RG4.

A second timing interval by control circuit T3 begins in response to a registered line circuit service request and following the successive operation of relays R0–R4, TA and TA1 as previously explained. In operating, relay TA operates relay RL to prepare for the recycling the WZ relays following either a second timeout by circuit T3 or the satisfactory serving of the newly registered service requests. Relay RL operates via contacts RL–2, TA–9, W1–4 and Z1–6 to ground and then locks via contacts RL–3, W1–5 and Z1–7. A second timeout by circuit T3 results in the operation of relay CCT which, in turn, releases relay W1 by opening contact CCT–2. The release of relay W1 causes frame gating to be cancelled as priorly described by operating relay CGA via contacts CGA–9, Z1–8 and W1–6 to ground. Gate cancellation results in a conventional gate alarm and the recycling of circuit T3 followed by the release of relays CCT, RG0–RG4, R0–R4, TA and TA1. The release of relay TA opens contact TA–8 to effect the release of relay Z1 followed by the release of relay RL.

If, prior to a second timeout, the route gate is cleared of all registered service requests, respective operated ones of the relays RG0–RG4 and R0–R4 release for, in turn, releasing relays TA and TA1 to cancel timing by circuit T3. The release of relay TA causes the release of both relays W1 and Z1 followed by the release of relay RL for indicating the satisfactory completion of calls toward operator positions for service.

i. Route Transfer (FIGS. 7 and 10)

A route which normally handles one class of incoming call consists of a group of position trunks which are distributed over all trunk link frames. Illustratively, there are from one to five routes in the distributor system and a maximum of 500 position trunks. Each vertical group on a line link frame contains lines all of the same class and a route is composed of one or more vertical groups of lines of the same class. Hence, the terms "route" and "class" are synonymous for the illustrative system.

The gate control circuit FPGC monitors the busy-idle status of position trunks and, when all trunks for a route are found busy, sends a route busy signal to each of the frames LF0–LF9 to prevent a line link frame marker seizure for that route. This prevents marker seizures for a route which has no position trunk available to serve the call.

During light traffic periods, selected routes are closed down and their traffic is transferred to other routes. As a result, a route transfer causes a predetermined route to serve its own class-of-call in addition to the transferred class-of-call. When a route transfer is initiated, the gate control circuit FPGC no longer monitors the busy-idle condition of the vacated routes. The operated route transfer relays RT0–RT4 of FIG. 10 switch route busy signals to the line link frames through a cross-connection field in control circuit FPGC. In the gate control circuit FPGC, route transfer relays RT0–RT4 are selectively operative illustratively under key control from a traffic control center TCC for providing twilight and night operator position closings. Contacts of the RT0–RT4 relays are utilized to switch the position and trunk group availability signals for the routes and specifically within the position group busy circuits PGC0–PGC9. Illustratively, route transfer relay RT0 is operative for switching position availability signals supplied to vertical group terminal VG0–9 for link frame LF9 from the 0 route operator group to another of the routes 1–4 via terminals TPG0–9 and R1–9 through R4– 9 and cross-connections.

Each of the line link frames LF0–LF9 comprise similar route transfer relays LRT0–LRT3 (not shown) to reassociate the vertical groups that comprise a route into a new route assignment for twilight and night closings. The purpose of route transfer in the line link frames is to maintain proper queuing of calls by ensuring that there is only one route gate for each route. In FIG. 7, there are five vertical group terminals VGT0–VGT4 for the five vertical groups on a frame and two sets of route terminals namely TRT0–TRT3 and TR0–TR3. Cross-connections are made between the VGT0–VGT4 and TR0–TR3 terminals and between VGT0–VGT4 and TRT0–TRT3 terminals in accordance with predetermined twilight and night closing assignments. Contacts of the LRT0–LRT3 relays interconnect respective ones of the terminals TRT0–TRT3 and TR0–TR3 illustratively to reassign vertical group 0 to vertical group 1 and group 1 to group 2 when the respective route transfer relays are operated.

Figure 19:
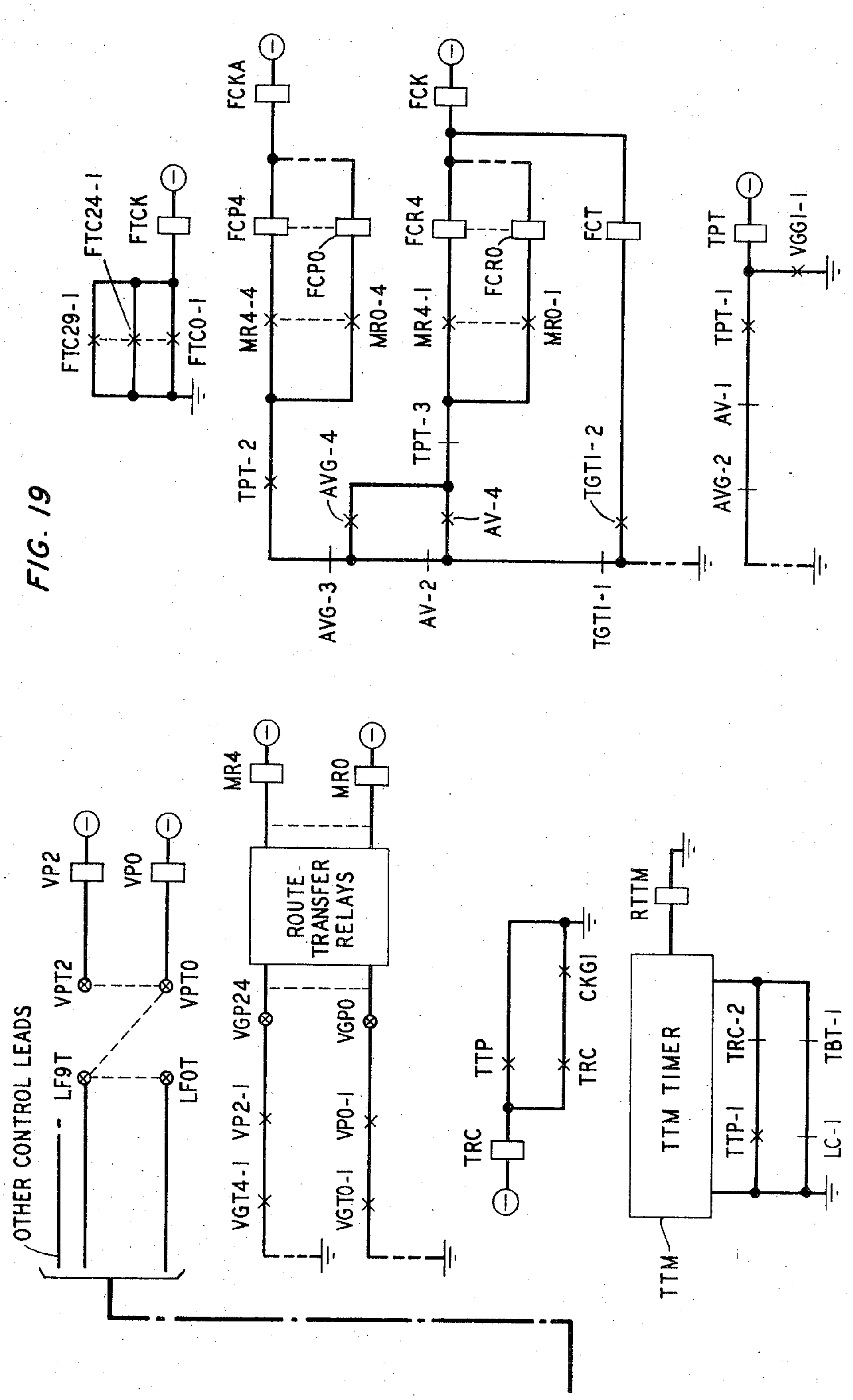

The same pattern of route transfer is accomplished in each of the markers M0–M4 under control of marker route transfer relay shown in block form in FIG. 19 for enabling the markers to identify the correct route class of each call.

Figure 14:
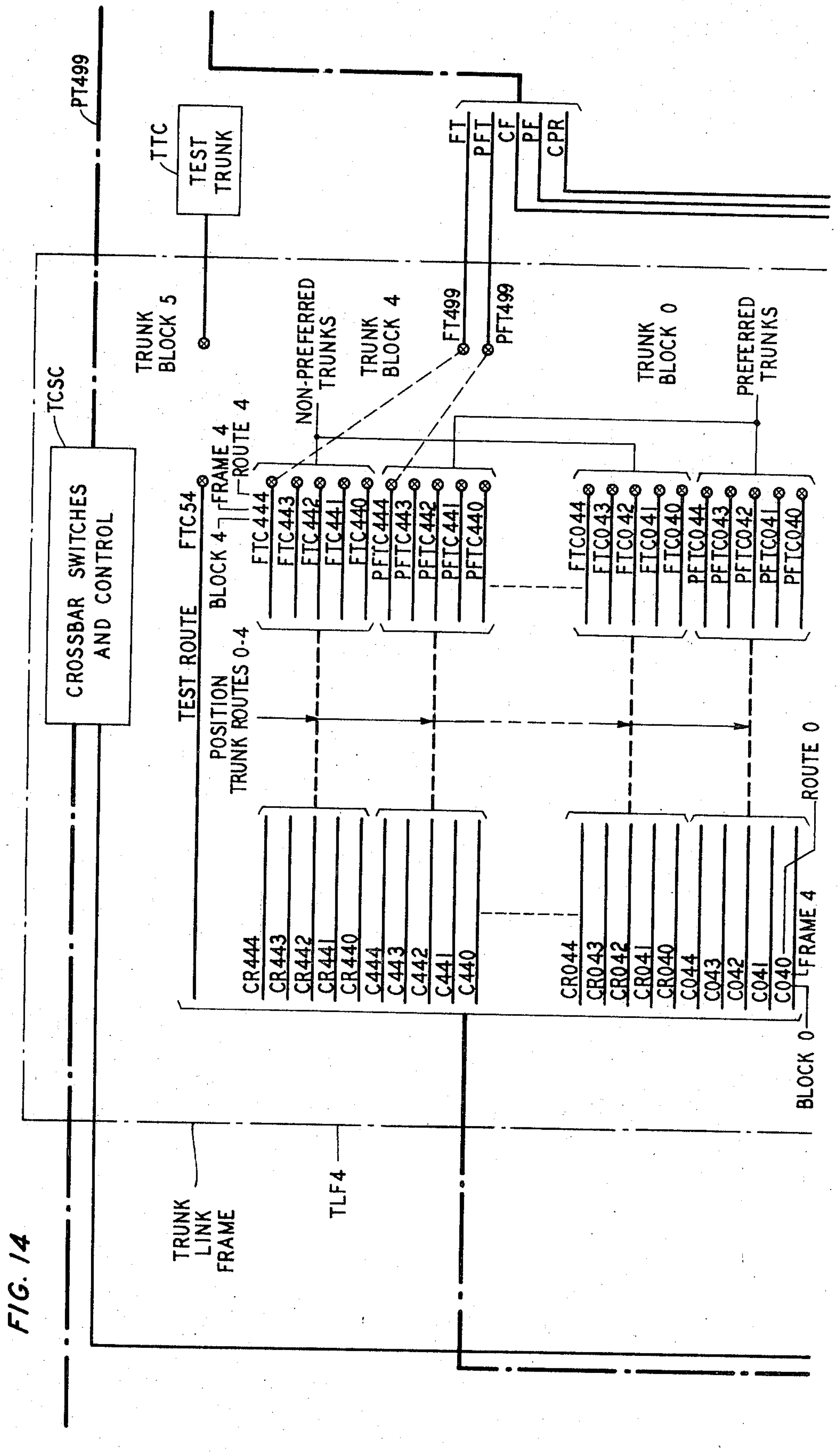
FIGS. 14 and 15 depict trunk link frame and trunk link marker connector circuits.
Figure 15:
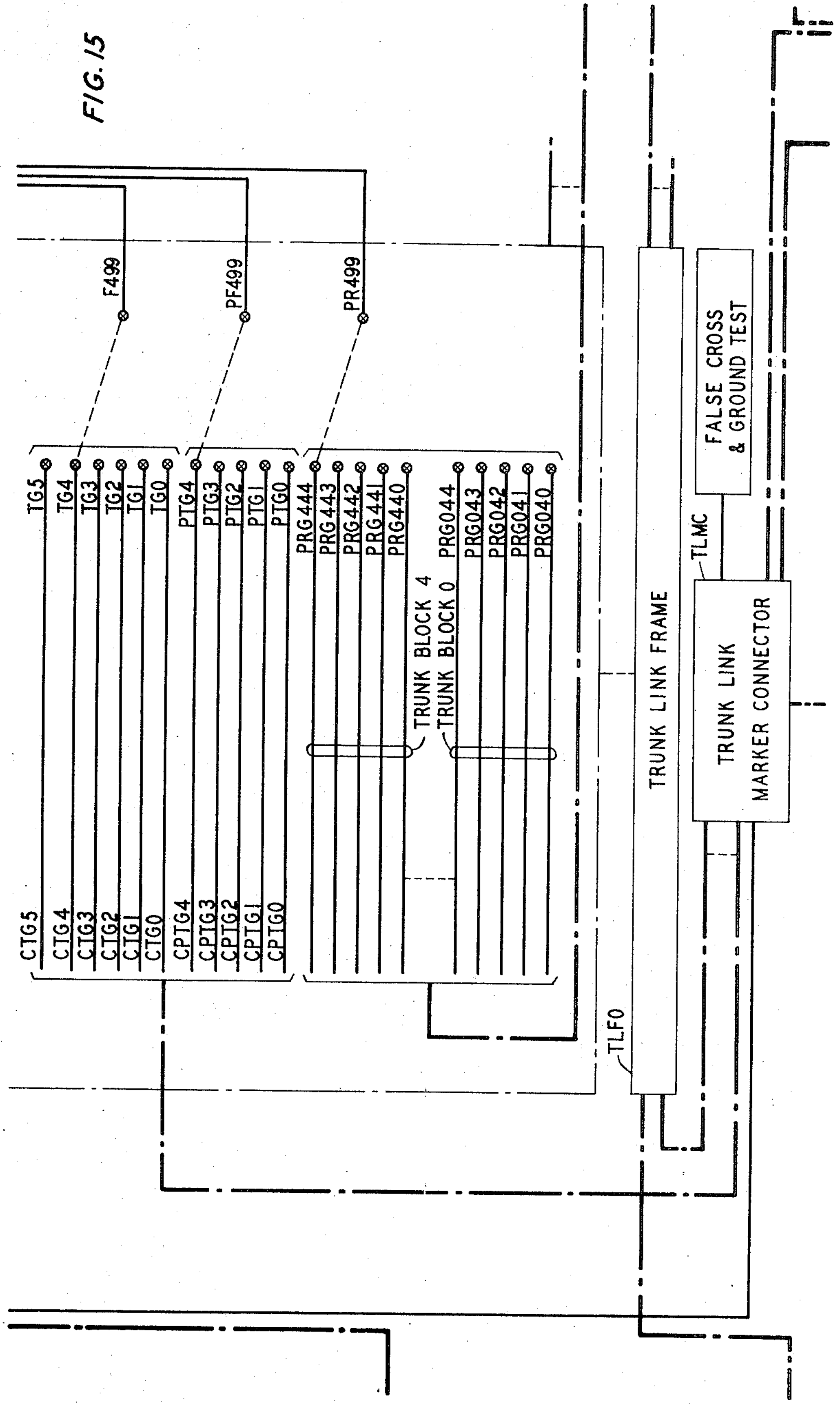
Figure 16:
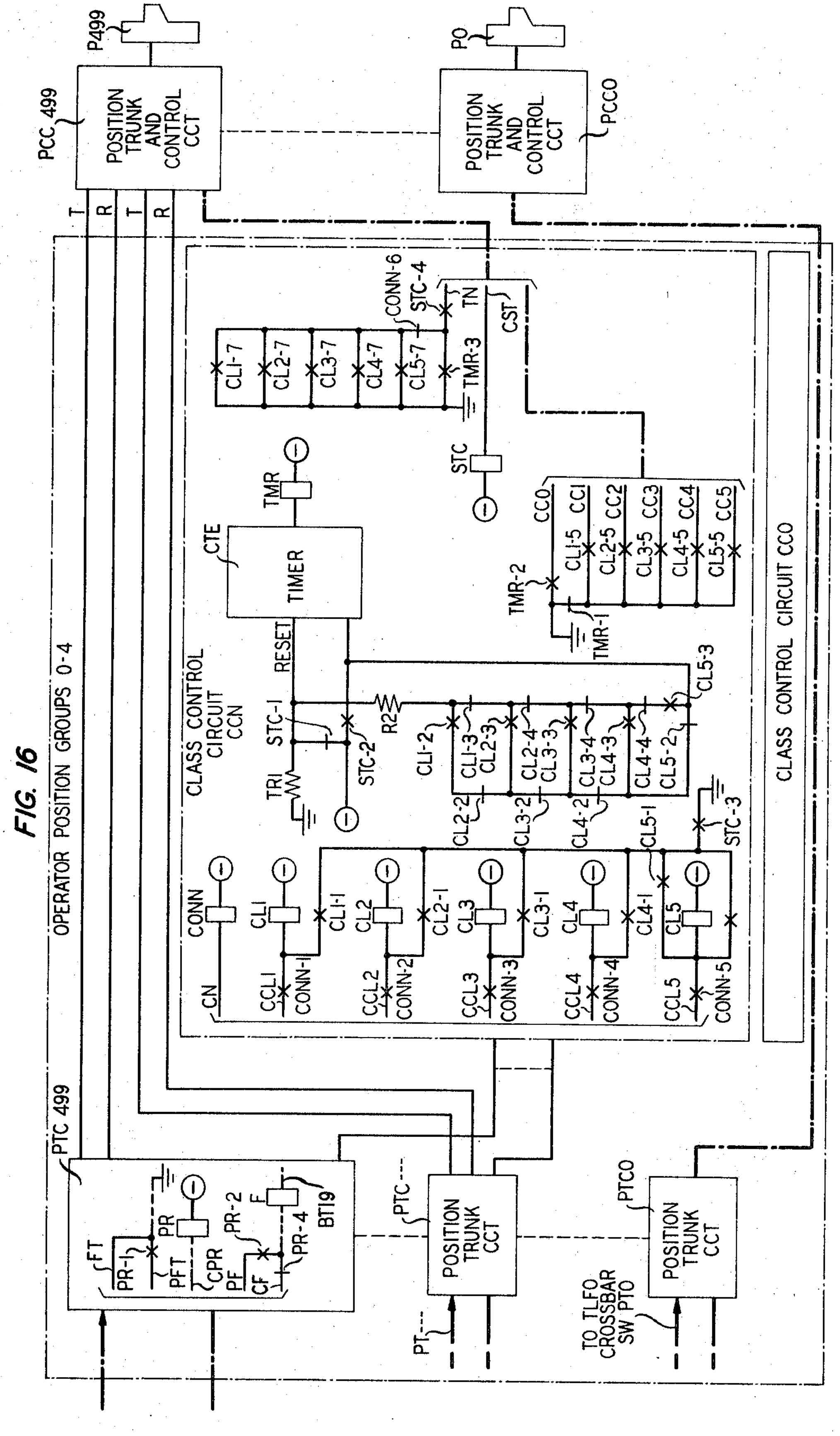
FIG. 16 shows the operator positions, position trunk circuits and class control circuit.

Operator Position Trunk Arrangements (FIGS. 14–16)

Before describing the circuit actions which occur in a marker following the admission of a calling line circuit through the frame, route and position gates on a line link frame, it is advisable to review the trunking pattern on the trunk link frames TLF0–TLF4. Each of the position trunk circuits PTC0–PTC499 of FIG. 16 is connected to a respective one of the trunk link frames TLF0–TLF4 via an individually associated operator position trunk PT0–PT499 and control conductors. Illustratively, trunk circuit PTC499 is connected to crossbar switches TCSC on trunk link frame TLF4 over trunk PT499 and over control conductors FT, PFT, CF, PF and CPR. The latter conductors are used for the communication of switching control information including preferred and nonpreferred position signals among the trunk circuit PTC499, frame TLF4, markers MO–M4 and the position trunk gate and control circuit PTG4.

In the illustrative embodiment, each of the FT and PFT conductors of a trunk circuit are used by a trunk circuit for signaling a marker via the trunk link frame of the nonpreferred and preferred status of the associated operator position for serving a call. Each of the CF and PF conductors is used by markers M0–M4 for activating a conventional F relay (depicted for example in FIG. 217 of Busch) in the associated trunk circuit to perform conventional switching control operations following a nonpreferred or preferred selection of the trunk circuit by a marker. The CPR conductor of each trunk circuit is used by an appropriate one of the position trunk gate and control circuits PTG0–PTG4 of FIG. 17 for operating the respective PR relay in that trunk circuit to permit an associated idle nonpreferred trunk to become preferred following an unsuccessful bid of a marker to find and select an idle preferred trunk.

Each of the trunk link frames is illustratively equipped with a maximum of six blocks of 20 operator position trunks for a maximum of 30 trunk blocks for five trunk link frames. As shown in FIG. 14, each of the trunk blocks, except trunk block 5 which is reserved for test trunks, is associated with an individual group of five FTC terminals for nonpreferred service treatment and is further associated with an individual group of five PFTC terminals for preferred service treatment. Illustratively, trunk link frame TLF4 comprises terminals FTC040–FTC444 for nonpreferred service for the trunk blocks 0–4 on that frame and terminals PFTC040–PFTC444 for trunk blocks 0–4 for the preferred service treatment. The last numeral in each of the FTC and PFTC terminal designations specifies one of the five routes, the next more significant digit numeral designates one of the five frames TLF0–TLF4, and the most significant digit numeral indicates one of the six trunk blocks on the frame. Each of trunk blocks 5 is reserved for test calls and is equipped with a single FTC terminal punching on each frame TLF0–TLF4, such as punching FTC54 of frame 4. Test trunks in blocks 5 are illustratively not afforded the preferred-nonpreferred treatment of operator position trunks.

The trunk circuits PTC0–PTC499 have their respective FT and PFT conductors connected to respective terminals FT0–FT499 and PFT0–PFT499 which are, in turn, cross-connected to a respective one of the FTC terminals and one of the PFTC terminals. The latter cross-connections are made in accordance with the assignment of an operator position trunk to a specific trunk block and to a specific route class. Illustratively, trunk PT499 is assigned to trunk block 4 and to route class 4 on frame TLF4. Accordingly, the FT499 terminal associated with the FT conductor of trunk PT499 is cross-connected to terminal FTC444 for nonpreferred treatment and the terminal PFT499 associated with PFT conductor of trunk PT499 is cross-connected to terminal PFTC444 for preferred treatment. All of the 20 trunks in a trunk block which are assigned to service the same route class, have their FT and PFT terminals cross-connected to the respective FTC and PFTC terminal uniquely associated with that route in the block.

The CF and PF conductors of each of the trunk circuits are terminated on the trunk link frames in respective ones of the F0–F499 and PF0–PF499 terminals which are, in turn, selectively cross-connected respectively to terminals TG0–TG5 for marker selection of a group of nonpreferred trunk circuits and to terminals PTG0–PTG5 for marker selection of a group of preferred trunk circuits. Terminals PTG0–PTG5 and TG0–TG5 are selectively grounded by a marker following its testing of the PFTC and FTC terminals for idle trunk circuits and such grounding effects the selection of an appropriate one of the five groups, or route classes, of trunks having respectively preferred and nonpreferred idle trunks.

Each of the trunk link frames TLF0–TLF4 is equipped with 25 PRG terminals which are equally allocated among trunk blocks 0–4 on that frame. Each such terminal in a trunk block is uniquely associated with one route class and is cross-connected to ones of the PR0–PR499 terminals associated with all trunk circuits of the same route class and trunk block. Accordingly, as hereinafter explained, when a marker is unsuccessful in finding and selecting a preferred position trunk, the position trunk gate and control circuit assigned to the same route class operates the PR relays in all idle nonpreferred position trunk circuits to allow them to become preferred.

An operator position trunk selection sequence on a call is controlled by a marker M0–M4 and commences by the testing and attempted selection of an idle one of the trunk link frames TLF0–TLF4 having preferred trunks. The marker seizes such a frame via a trunk link frame marker connector TLMC of FIG. 15 and then tests the PFTC terminals as hereinafter described to hunt for and select a trunk block having a preferred trunk of the route required for the call and as signified by ground signals thereon from the associated preferred trunk circuits. If the marker finds no preferred trunk available, it signals the appropriate one of the position trunk gate and control circuits PTGCO–PTGC4 to effect the opening of the position trunk gate to admit idle nonpreferred position trunks of the desired route. In the latter operation, the position trunk gate causes the operation of all PR relays in the idle nonpreferred trunk circuits on all trunk link frames for enabling such circuits to become preferred. The marker concurrently tests the FTC terminals to hunt for and select a trunk block having at least one position trunk for serving the call. Following the selection of a trunk block the marker selects, on a preference basis, one of the available trunks.

Figure 17:
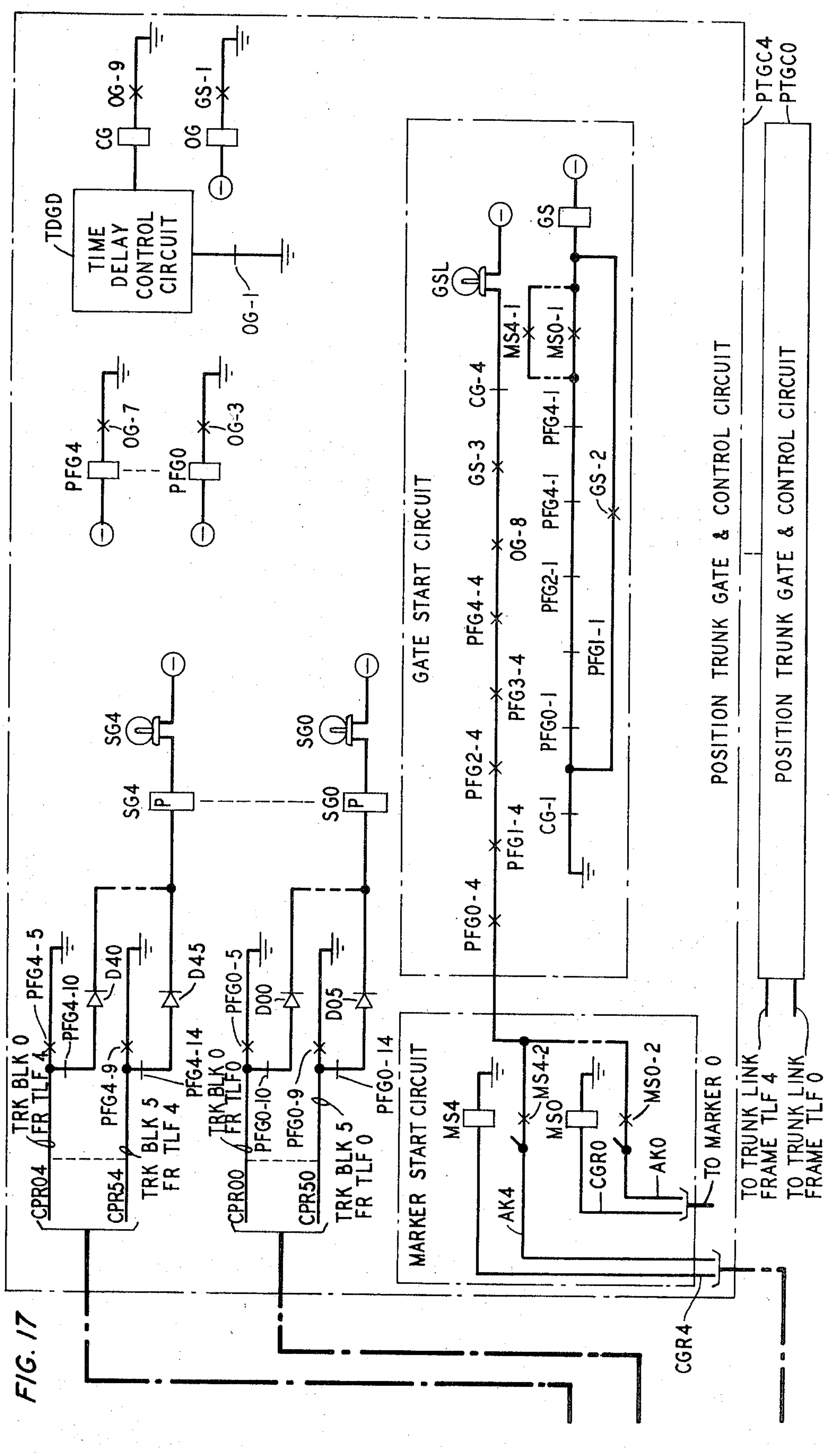
FIG. 17 illustrates the position trunk gate and control circuit.

Position Trunk Gate and Control Circuits (FIG. 17)

Operator positions PO–P499 are grouped together in teams and are physically situated either locally in the same plant as the ACD network or are remotely displaced for service convenience and practical economy. The teams vary in size during a 24-hour period as positions are manned and unmanned. It is desirable, in light of such variations, to provide for equal call loads on available operators in order to avoid problems in the administration of traffic and personnel. Calls are therefore, in accordance with our invention, distributed uniformly across occupied positions within a team and, importantly, among all teams in proportion to the number of positions which are occupied.

According to our invention, position trunk gate and control circuits PTGC0–PTGC4 are provided for assigning each available operator position with the status of preferred or nonpreferred on a route class basis. This assignment enables a marker in accordance with another aspect of our invention to try always to first select a preferred position trunk of the proper route class and only to select a nonpreferred position trunk when either all preferred trunks are busy serving calls or idle preferred trunks are on trunk link frames busy with other markers.

A position trunk enters the position gate and becomes preferred when an associated gate control circuit PTGC0–PTGC4 operates the PR relay in the associated trunk circuit. The PR relay, in operating, switches-in the PF and PFT conductors to the trunk link frame for enabling the marker to select the trunk circuit on a preferred basis. Illustratively, when the PR relay of circuit PTC499 in FIG. 16 is operated, it actuates its contact PR–1 to connect a position available ground signal to conductor PFT extending to trunk link frame TLF4 for enabling a marker M0–M4 to select trunk PT499 on a preferred basis. Relay PR remains operated until the call is subsequently established to an associated operator position, illustratively position P499 via a position trunk and control circuit PCC499. After a disconnection from the latter call, relay PR is maintained released to hold the associated position trunk in a nonpreferred status until it is regarded as having been idle the longest in a certain interval, whereafter it is again gated to a preferred status.

In addition, when the PR relay in the circuit PTC499 of FIG. 16 is operated, it switches the PF conductor into the control path of a conventional F relay via contact PR–2 for effecting control and supervisory call connections through the trunk and line link frame network under control of a marker M0–M4.

Each of the position trunk gate and control circuits PTGC0–PTGC4 is associated with an individual one of five route classes and is connected to all trunk link frames TLF0–TLF4. Each of the circuits PTGC0–PTGC4 controls the operation of all PR relays in the trunk circuits PTC0–PTC499 assigned to the same route.

Figure 20:
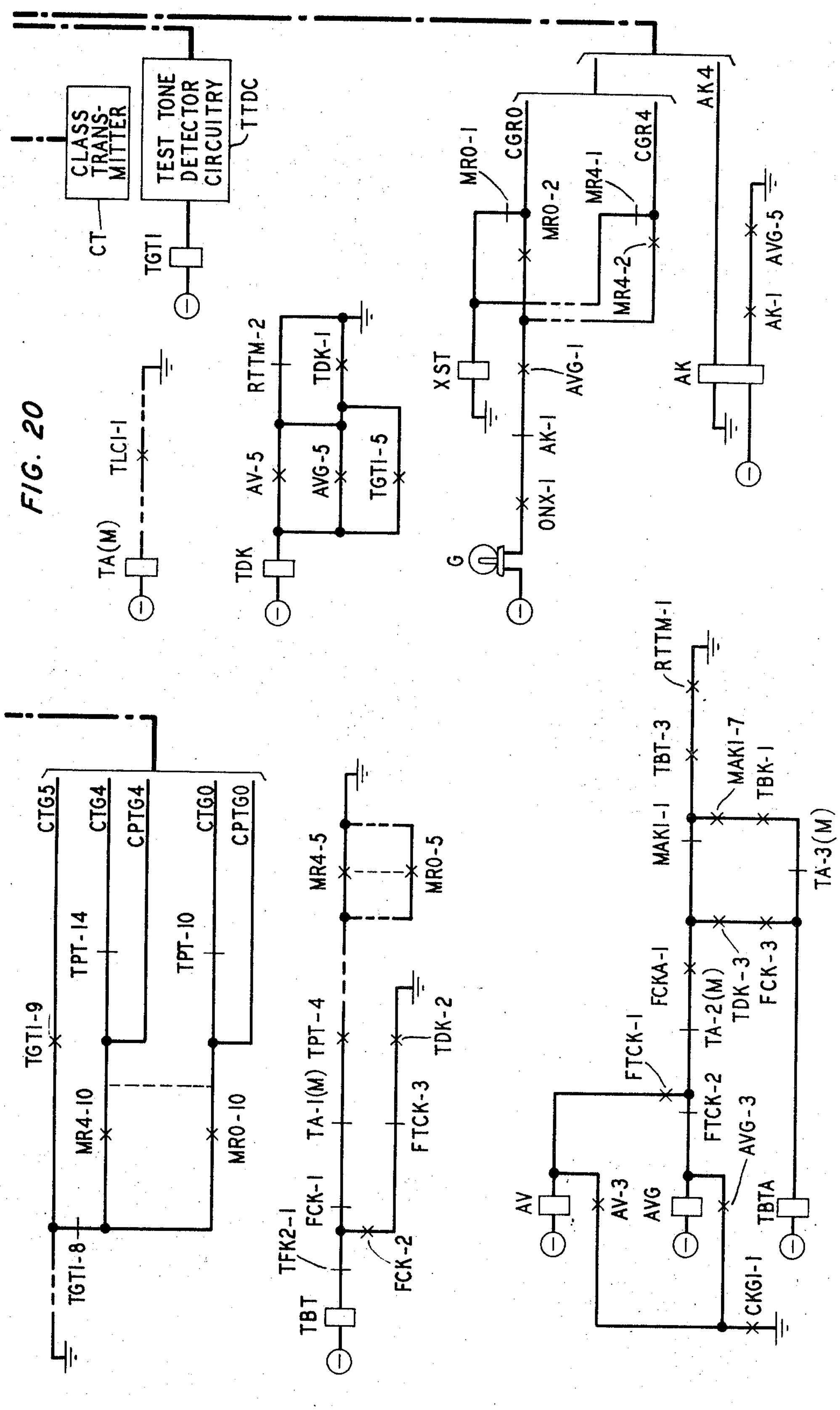

Control circuits PTGC0–PTGC4 are essentially the same in structure and mode of operation except that they are assigned to different routes. Accordingly, for ease in understanding and by way of example only the circuit PTGC4 is referred to in the following description. Each of the markers M0–M4 is connected to a respective marker start relays MS0–MS4 of FIG. 17. Relays MS0–MS4 are connected over conductors CGR0–CGR4 to a marker advance contact configuration in FIG. 20 for initiating a marker start to open the position gate for the associated route. In FIG. 20, a relay XST is connected via contacts MR0–1 through MR4–1 to monitor for false crosses of foreign potentials on conductors CGR0–CGR4 which could interfere with position trunk gating. The remainder of the associated contact configuration in FIG. 20 is used on a marker advance to operate an associated one of the relays MS0–MS4 when a desired preferred position trunk is found unavailable on a trunk link frame. The advance is controlled by relay AVG in the marker. For example, marker M4 causes the operation of relay MS4 for route 4 in a path from ground through its winding, conductor CGR4, contacts MR4–2, AVG–1, AK–1 and ONX–1 to negative potential via lamp G.

In operating, a marker start relay MS0–MS4 activates a gate start relay GS of FIG. 17 for initiating a series of circuit actions which result in the opening of the position trunk gate for changing idle trunk circuits of the route from a nonpreferred to a preferred status. Relay GS is activated via contacts MS0–1 through MS4–1, PFG4–1, PFG3–1, PFG2–1, PFG1–1, PFG0–1 and CG–1 to ground and then is locked operated via its contact GS–2. The activation of relay GS operates an open gate relay OG via contact GS–1 which, in turn, initiates a timing operation by a time delay control circuit TDGD by opening contact 0G–1. Circuit TDGD by its timing period determines the length of time that the position trunk gate is opened for the route.

The operation of relay 0G also operates the position trunk gate relays PFG0–PFG4 over the obvious paths via contacts 0G–3 to 0G–7 to ground. Upon operating, relay PFG0–PFG4 causes a progress signal to be sent back to the marker for internal checking functions. The path for such signal is from negative potential via lamp GSL, and the contacts CG–4, GS–3, 0G–8, PFG4–4 through PFG0–4 and MS4–2 (for marker M4) to conductor AK4 toward the marker M4. The operation of relays PFG0–PFG4 also cause the opening of the position gate for the route so that associated idle nonpreferred position trunks on all trunk link frames are admitted to a preferred status. Relays PFG0–PFG4 control the application of gate opening potentials to all frames TLF0–TLF4 via the conductors CPR00–CPR50 (frame TLF0) through CPR04–CPR54 (frame TLF4). These potentials control the admission to a preferred status of position trunks (in all trunk blocks) associated with the same route controlled by circuit PTGC4. The potentials are ground signals applied via make contacts of relays PFG0–PFG4 to conductors CPR00–CPR50 through CPR04–CPR54 for operating respective PR preference relays in idle ones of the position trunk circuits associated with the route via the trunk link frame cross-connections between associated terminals PRG000–PRG504 through PRG040–PRG544 and PR0–PR499. Relays PR in operating cause the position trunk circuits to apply position available signals to the PFT terminals for affording preferred status to associated operator positions as previously described.

Illustratively, trunk circuit PTC499 is assigned to trunk block 4, trunk link frame TLF4 and route 4. Accordingly, its relay PR is operated to switch trunk PT499 to a preferred status via conductor CPR, terminal PR499 and cross-connections to terminal PRG444, conductor CPR54 and contact PFG4–9 to ground.

The position gate remains open under control of relays PFG0–PFG4 until the end of the timing period generated by circuit TDGD of FIG. 17. At the end of such timing, relay CG is operated via contact 0G–9 to ground. In operating, relay CG effects the closing of the position gate by opening the locking and operate path for relay GS which, in turn, releases and causes the release of relays 0G and PFG0–PFG4. The latter operation removes the operate grounds for relays PR in the associated idle trunk circuits. Thereafter, preferred and nonpreferred operator position trunks are provided for serving calls on an equitable basis. The operation of relay CG also withdraws the progress signal to the marker at contact CG–4.

A conventional standing test for false grounds on conductors CPR00–CPR50 through CPR04–CPR54 is made under control of the relays SG0–SG4. The latter relays are connected via diodes D00–D05 through D40 and D45 and contacts PFG0–10 to PFG0–14 and PFG4–10 to PFG4–14 to respective conductors CPR00–CPR50 and CPRO4–CPR54. When one of these relays operates in response to a false ground on the tested conductor, it provides a conventional alarm indication for maintenance personnel.

Figure 18:
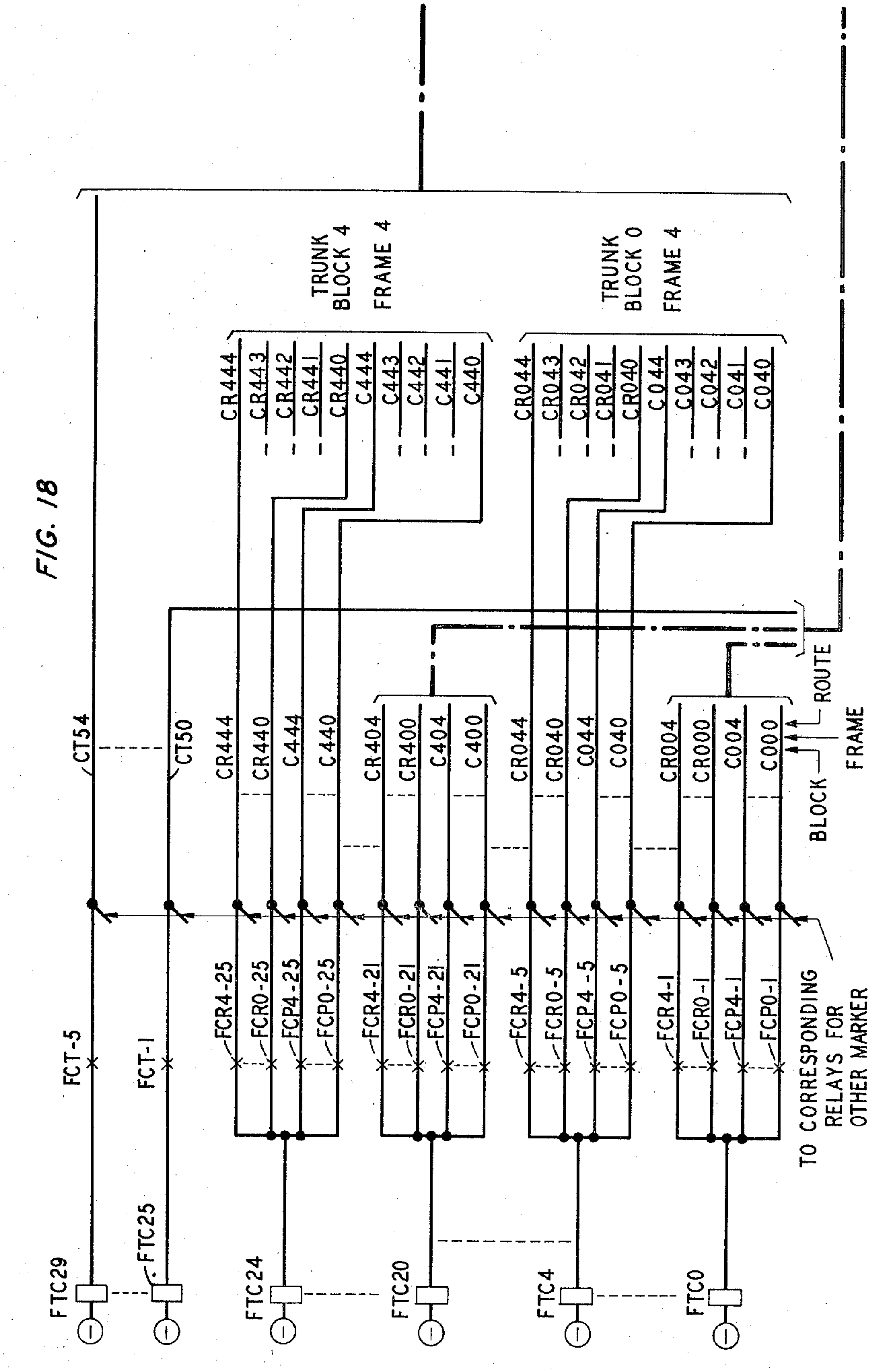
FIGS. 18 through 20 show a common control marker circuit.

Markers (FIGS. 18–20)

Each of the markers M0–M4 controls the selection, establishment and testing of communication paths, or channels, through the line and trunk link frames between calling line circuits and position trunks. The following description of the markers in performing its switching functions focuses on the equipment provided by the present invention in each of the markers M0–M4 for preferred and nonpreferred operator position treatment in cooperation with the trunk link circuitry, position trunk circuits, and the position trunk gate and control circuits. The remainder of the marker structure and mode of operation for controlling the distribution of calls from the line circuits LC1–LCn to operator positions P0–P499 are, from a switching standpoint, essentially the same as disclosed in the Busch patent.

A marker enters the call processing after a vertical group start-relay operates and an operator position is available for serving the class-of-call on a service requesting line. Illustratively, after relay VGS0 of FIG. 7 operates and an operator is determined to be available for serving a call on a service requesting line circuit LCn as previously described, the line link frame LF9 bids through a marker preference and control circuit MCPC of FIG. 7 in competition with the other line link frames LF0–LF8 for a connection through a line link marker connector LLMC to an idle one of the markers M0–M4. Specifically, such a bid is applied to preference circuit MCPC of FIG. 7 by supplying a resistance battery to conductor MS–9 via contacts VGS0–1, GRA4–3 and resistor STRA. Connector LLMC upon engaging a marker identifies the line link frame requesting service. To do so, the connector LLMC grounds the appropriate one of the 10 terminals LF0T–LF9T of FIG. 19 to identify the service requesting line link frame. Terminals LF0T–LF9T are cross-connected to variable pattern terminals VPT0–VPT2 for establishing one of three possible vertical group patterns for route selection. Relays VP0–VP2 are connected to respective VPT0–VPT2 terminals to provide flexibility in the association of vertical groups with the routes. Illustratively, a particular vertical group on all link link frames can be associated with the same route; or, if desired, a vertical group on some line link frames can be associated with one route while the same vertical group on other line link frames can be associated with a different route. A VP0–VP2 relay is operated in response to a ground extended to a respective terminal VPT0–VPT2 and cross-connections to terminals LF0T–LF9T upon a line link frame start.

After a VP0–VP2 relay is operated and a marker selects a preferred vertical group on a line link frame initiating a start in a manner as described in Busch beginning in column 16, the marker has all the information needed for identifying the class-of-call and the operator required for serving the call. The marker then proceeds to operate an appropriate route relay MR0–MR4 of FIG. 19 which defines substantially all of the control information needed for establishing call connections through the line and trunk link frames. A route relay MR0–MR4 is operated under control of a contact of a vertical group test relay VGT0–VGT4 (FIG. 26 of Busch which is operated as described in Busch upon vertical group identification), as well as contacts of variable pattern relays VP0–VP2 and route transfer relays. The latter relays (not schematically shown) control transfers of classes-of-calls for service by attended operator positions during twilight and night closing periods and in cooperation with the route transfer arrangements for the line link, frames as herein disclosed in FIGS. 7 and 10.

According to our invention, each of the markers M0–M4 is equipped with circuitry which is activated following a marker route relay operation for initially testing for preferred position trunks on all trunk link frames TLF0–TLF4 and, if no such trunks are available, for advancing to test for nonpreferred position trunks. This circuitry as shown in FIG. 19 includes the relays FCP0–FCP4 for preferred testing and relays FCR0–FCR4 for nonpreferred testing. The circuitry further includes a frame cut-through relay FCT which is used on test calls for selecting idle test trunks. A test for preferred trunks enters the call processing after a marker makes a vertical group identification as described in Busch beginning in column 16 and then causes the operation of a vertical group gate relay VGG1 (Busch FIG. 27). In accordance with our invention, the latter operation activates a relay TPT of FIG. 19 to test for preferred trunks. Relay TPT operates via contact VGG1–1 to ground and then locks via contacts TPT–1, AV–1 and AVG–2 to ground. In operating, relay TPT cooperates with the activated route relay to operate an associated one of the relays FCP0–FCP4 for cutting through associated test leads between frame test cut-through relays FTC0–FTC24 of FIG. 18 and preferred trunk terminals PTC000–PTC444 on frames TLF0–TLF4. The operate path for the relays FCP0–FCP4 is in series with relay FCKA and contacts MR0–4 or MR4–4, TPT–2, AVG–3, AV–2 and TGT1–1 to ground.

Concurrent with the operation of relay TPT, the marker initiates a timing interval within which an available preferred position trunk should be selected or after which the marker is advanced to test nonpreferred trunks. The timing action is started when the operated relay TPT activates a trunk busy timing relay TBT of FIG. 20 via contacts TFK2–1, FCK–1, TA–1(M), TPT–4 and a contact MR0–5 or MR4–5 to ground. In operating, relay TBT starts a timing operation by timer TTM of FIG. 19 by opening contact TBT–1 during which the marker tests for a preferred position trunk. If such a trunk is found, and it is terminated on a trunk link frame not busy with another marker, a trunk available relay TA(M) of FIG. 20 is operated under control of a contact TLC1–1 of a relay TLC1 in the Busch system to effect the release of relay TBT and, in turn, the termination of timing by timer TTM. On the other hand, if relay TA(M) is not operated at the end of the TTM timing operation, relay RTTM is operated for causing the marker to advance to test for available nonpreferred position trunks of the appropriate route.

The operation of relay RTTM causes the advance by operating either relay AV or relay AVG of FIG. 20 principally under control of relay FTCK of FIG. 19. Relay AV is operated when a preferred position trunk is available, but it is terminated on a trunk link frame busy with another marker. Relay AVG is operated when no preferred trunk is available. The operate path for relay AV and AVG extends through a respective closed contact FTCK–1 or FTCK–2 and contacts TA–2(M), FCKA–1, MAK1–1, TBT–3 and RTTM–1. In operating, relay AV or AVG locks via its respective contact AV–3 or AVG–3 in series with contact CKG1–1 to ground. Operated relay AV or AVG also effects the release of priorly operated ones of relays FCP0–FCP4, FCKA and TPT by opening contacts AV–2 and AV–1 or AVG–3 and AVG–2. When relay TPT releases, the appropriate one of the relays FCR0–FCR4 and relay FCK operates under control of the operated one of the route relay contacts MR0–1 to MR4–1 and the contact TPT–3 and contacts AVG–4 and AV–2 or AV–4 in series with TGT1–1 to ground for cut-through of the nonpreferred trunk test leads to relays FTC0–FTC24 as hereinafter explained. The release of relay TPT also opens contact TPT–4 for effecting the release of relay TBT of FIG. 20 which, in turn, recycles timer TTM of FIG. 19 for releasing relay RTTM. The latter action causes the operation of a "-timer down-check" relay TDK of FIG. 20 via contacts AV–5 or AVG–5 in series with contact RTTM–2. Relay TDK then locks via contact TDK–1. In operating, relay TDK reoperates relay TBT of FIG. 20 via contacts TFK2–1, FCK–2, FTCK–3 and TDK–2 to ground. Upon operating, relay TBT starts another timing operation by timer TTM by opening contact TBT–1 for timing the test for a nonpreferred position trunk. If there are no available nonpreferred trunks, timer TTM times-out and operates relay RTTM which then operates relay TBTA of FIG. 20 via contacts FCK–3, TDK–3, MAK1–1, TBT–3 and RTTM–1 to ground. The operation of relay TBTA causes the release of the marker and a circuit advance for conventional "no trunks available" operations. In contrast, when available, relay FTCK operates as later described and releases relay TBT to cancel timing by timer TTM and to enable the marker to proceed with the selection, testing and establishment of call connections through the line and trunk link frame networks.

Before proceeding with an explanation of the actual testing of preferred and nonpreferred trunks by means of the FTC0–FTC24 relays of FIG. 18, it is advantageous to describe the test call features of the relay FCT in the trunk test advance circuitry of FIG. 19. Relay FCT is used to cause a marker to establish connections from a calling line circuit to a test trunk circuit, such as circuit TTC of FIG. 1. As disclosed in R. E. Fenstermaker–R. M. Swanson U.S. Pat. application Ser. No. 751,165, filed Aug. 8, 1968, a craftsman causes a test call to be identified by a unique tone applied to the tip and ring path connections through a line circuit and the line and trunk link network. As hereinafter explained, when call connections are cut through between the calling line circuit and a selected preferred or nonpreferred position trunk circuit, but before the operator is alerted to the call, the test tone is detected in the marker by tests tone detector circuitry TTDC of FIG. 20 which thereupon operates relay TGT1 of FIG. 20 for causing the release of the cut-through call connections and the operation of relay FCT to test for an idle test trunk. Relay FCT operates via contact TGT1–2 to ground. In operating, relay FCT releases operated ones of the relay FCP0–FCP4, FCKA, TPT or FCR0–FCR4 and FCKA while it concurrently cuts-through the FCT25–FCT29 relays associated with test trunks on all trunk link frames TLF0–TLF4. The subsequent circuit operations in the marker for testing and establishing connections to test trunks are essentially the same as for connections to preferred and nonpreferred position trunks as hereinafter explained.

Turning now to the testing of preferred and nonpreferred position trunks with reference to FIG. 18, each of the trunk link frames TLF0–TLF4 is associated with an individual group of six of the FTC0–FTC29 relays. Illustratively, relays FTC0–FTC4 are associated with the trunk blocks 0 on each of the trunk link frames TLF0–TLF4, respectively, and test for the availability of position trunks serving routes 0–4, respectively. Similarly, relays FTC5–FTC9 (not shown) are associated with trunk blocks 1 on each of the trunk link frames TLF0–TLF4 and test for the availability of position trunks serving routes 0–4 in the blocks 1. Relays FTC20–FTC25 are associated with trunk blocks 4 on each of the frames TLF0–TLF4, respectively, and test for the availability of trunks of routes 0–4 in the blocks 4. The trunks associated with the test route are terminated in trunk block 5 on all frames TLF0–TLF4 and relays FTC25–FTC29 are associated with trunk blocks 5 on those frames.

According to our invention, each of the relays FTC0–FTC24 are advantageously utilized for detecting the availability of both preferred and nonpreferred position trunks in an individual one of the associated 25 trunk blocks on frames TLF0–TLF4. For example, relay FTC24 is associated with trunk block 4 on frame TLF4 and detects the availability of preferred and nonpreferred trunks for all of the routes 0–4 in that block. Each of the relays FTC0–FTC24 has its operate winding connected through contacts of the relays FCP0–FCP4 (preferred) and FCR0–FCR4 (nonpreferred) to an individual group of five conductors C000–C444 and five conductors CR000–CR444, respectively, which are terminated on the trunk link frame terminal punchings associated with preferred and nonpreferred position trunks. Illustratively, relay FTC24 is connected via five contacts FCP0–25 through FCP4–25 and the associated five conductors C440–C444 to the TLF4 trunk link frame terminals PFTC440–PFTC444 of trunk block 4 for preferred position trunk testing of the five routes in that trunk block 4. For nonpreferred position trunk testing in the same trunk block, relay FTC24 is connected via five contacts FCR0–25 through FCR4–25 and the associated five conductors CR440–CR444 to the TLF4 trunk link frame terminals FTC440–FTC444 of trunk block 4.

Each of the relays FTC25–FTC29 is reserved for detecting the availability of test trunks in a trunk block 5 on an individual one of the trunk link frames TLF0–TLF4. Relays FTC25–FTC29 have their operate windings connected via contacts FCT–1 through FCT–5 to conductors CT50–CT54 each of which is terminated at an individual test route terminal punching FTC50–FTC54 on the frames TLF0–TLF4, respectively. A relay FTC25–FTC29 is operated on test calls when an available test trunk is available and the operate path is completed by the ground supplied by an available test trunk circuit in the associated trunk block 5.

Accordingly, whenever the marker tests for the availability of preferred position trunks in a desired one of the five routes to an operator, it activates an appropriate one of the five relays FCP0–FCP4 associated with that route. The latter action cuts-through the FTC0–FTC24 relays to all of the trunk link frames TLF0–TLF4 for determining the availability of such trunks in all trunk blocks. Such availability is indicated by ground signals supplied to the terminal punchings PFTC000–PFTC444 by the available preferred trunk circuits as priorly described. The presence of any preferred idle trunk in a trunk block causes the operation of the associated one of the FTC0–FTC24 relays in response to the completed path from the winding of that relay to the ground supplied by an associated available preferred trunk circuit in that block. Following the operation of an FTC0–FTC24 relay, a check relay FTCK of FIG. 19 is activated via the obvious path through an FTC0–1 to FTC24–1 contact to ground.

Where there is an idle preferred trunk as indicated by the operated relay FTCK, but only on a trunk link frame which is busy serving a call for a marker, that frame is not concurrently engageable by a second marker as disclosed by Busch. Under such circumstances, our invention provides for the advance of the marker to test for nonpreferred trunks and, advantageously, without activating the position trunk gate and control circuits PTGC0–PTGC4. Our method of advancing under the latter conditions enables the preferred-nonpreferred trunk statuses to persist for maintaining equitable call distribution to operator positions P0–P499. The advance is initiated following the operation of relay RTTM under control of timer TTM as priorly described at the end of the timing interval allotted for preferred trunk testing. In operating, relay RTTM activates the advance relay AV of FIG. 20 via contacts FTCK–1, TA–2(M), FCKA–1, MAK1–1, TBT–3 and RTTM–1 to ground. The activated relay AV locks via contacts AV–3 and CKG1–1 to ground and concurrently effects the release of the operated one of the FCP0–FCP4 relays and relays FCKA and TPT via contacts AV–1 and AV– 2. The release of relay TPT causes the operation of the appropriate one of the FCR0–FCR4 relays and relay FCK via contacts TPT–3 and AV–4 as already described for allowing the marker to test for nonpreferred trunks.

In contrast, when there is no preferred position trunk of the desired route on frames TLF0–TLF4, it is an indication that all of the trunks assigned to that route have served at least one call. Accordingly, the illustrative embodiment of our invention provides for another marker advance to test for an idle nonpreferred trunk and, advantageously, to open the position trunk gate to allow all idle nonpreferred trunks of the desired route to become preferred. The unavailability of an idle preferred trunk is indicated by the released state of relay FTCK at the end of the TTM timer timing interval allotted for preferred trunk testing as priorly described. The advance is initiated following the operation of relay RTTM under control of timer TTM. In operating, relay RTTM activates the advance relay AVG of FIG. 20 instead of relay AV and under control of the nonoperated relay FTCK. Relay AVG operates via contacts FTCK–2, TA–2(M), FCKA–1, MAK1–1, TBT–3 and RTTM–1 to ground. Upon operating, relay AVG locks via contact AVG–3 and CKG1–1 to ground and concurrently releases the operated one of the FCP0–FCP4 relays and relays FCKA and TPT via contacts AVG–3 and AVG–2. The release of relay TPT causes the operation of the appropriate one of the relays FCR0–FCR4 and relay FCK via contacts TPT–3 and AVG–4 for allowing the marker to test for nonpreferred trunks.

The operation of relay AVG initiates the opening of the position trunk gate for the appropriate route by causing the operation of a marker start relay MS0–MS4 of FIG. 17 in the one of the position trunk gate and control circuits PTGC0–PTGC4 as previously explained. It is advantageous to note that whenever a position trunk is idle its associated position trunk circuit is arranged to supply a position available signal to its associated FTC terminal punching on the trunk link frame for informing the marker of its availability for serving a call at least on a nonpreferred basis. Illustratively, when the trunk circuit PTC499 is idle and regardless of the operated or released state of its relay PR, circuit PTC499 supplies a position available ground signal to its associated conductor FT for indicating its availability for switching a call to an operator on at least a nonpreferred basis. This arrangement enables a position trunk in a nonpreferred status (relay PR released) to be switched to a preferred status (relay PR operated) during a marker advance under control of relay AVG and without delaying or interfering with marker operations in the testing of nonpreferred trunks.

Following the operation of at least one of the relays FTC0–FTC24 on either a preferred or nonpreferred trunk test, the marker proceeds in a manner as explained in the Busch patent to select one of the trunk link frames TLF0–TLF4 connected with one or more idle position trunks of the desired route. When the marker is connected to the selected trunk link frame via a trunk link connector, such as connector TLMC, a group of 20 busy test leads (not shown) is extended from the marker to the selected trunk link frame in a manner as described in Busch beginning in column 25. The trunk link connector is controlled by the marker to further extend one of the busy test leads to each position trunk of the desired route in a specific one of the six trunk blocks having an available position trunk on the selected frame and under control of conventional trunk block relays (corresponding to relays TB0–TB5 of FIG. 133 of the Busch patent). The marker then tests for an idle trunk of the desired route in that trunk block and selects such a trunk for call service. From a traffic handling standpoint, the marker rotates the preference and selection of trunk blocks having idle position trunks and for the purpose of equitable call distribution to operator positions.

In accordance with our invention, the marker after selecting one of the trunk blocks 0–4 having an idle trunk of the desired route to an operator position, specifies the route class of the desired trunk within that block and, advantageously, distinguishes between the preferred and nonpreferred idle trunks in that block. It performs such functions by means of a marker contact configuration in the upper left of FIG. 20 which comprises contacts of the marker route relays MR0–MR4 (specifying route), the test preferred trunks relay TPT (distinguishing between preferred and nonpreferred), and the test call relay TGT1 (specifying test call or call to an operator). The contact configuration cooperates with the PR relays in the trunk circuits in trunk blocks 0–4 to control the operation of the conventional F relays in trunk circuits. Before proceeding with the description of the preferred and nonpreferred trunk selections within a trunk block, it is advantageous again to note that each of the trunk blocks 0–4 comprises trunks of routes 0–4 extending to operators and that trunk blocks 5 on frames TLF0–TLF4 comprise test trunks.

Referring by way of example to FIG. 15, the last mentioned marker contact arrangement is effective on calls to an operator to control the application of ground signals to the PTG0–PTG4 (preferred) and TG0–TG4 (nonpreferred) terminal punchings of frame TLF4 via respective conductors CPTG0–CPTG4 and CTG0–CTG4 and the connector circuit TLMC. When the marker is testing for a preferred position trunk in a trunk block relay TFTl is released and relay TPT is operated to block the selection of idle nonpreferred trunks in that block by opening contacts TPT–10 to TPT–14 to withhold ground from the TG0–TG4 (nonpreferred) terminals and while applying such ground only to one of the terminals PTG0–PTG4 (preferred) under control of an associated operated one of the marker route relays MR0–MR4. On the other hand, when the marker is testing for a nonpreferred trunk in a trunk block, relays TGTl and TPT are released for supplying a ground signal to one of the TG0–TG4 terminals as well as the associated one of the terminals PTG0–PTG4 under control of the associated one of the marker route relays MR0–MR4. It is an advantage of our invention that the application of ground to both the latter nonpreferred and preferred PTG and TG terminals on nonpreferred trunk testing enables the marker to select an idle trunk in the block irrespective of concurrent PR relay operations under control of the position trunk gate and control circuits PTGC0–PTGC4.

Each of the trunk circuits PTC0–PTC499 has its respective F- and PF terminals on a trunk link frame cross-connected to a respective one of the TG0–TG4 terminal and a respective one of the PTGO–PTG4 terminals according to its trunk route assignment. Illustratively, trunk circuit PTC499 is assigned to route class 4 and accordingly its terminals F499 and PF499 on frame TLF4 are cross-connected to terminals TG4 and PTG4, respectively. Accordingly, when trunk circuit PTC499 is in a preferred status (its relay PR operated) and is to be selected for call service, a conventional trunk block relay (not shown) of frame TLF4 and block 4 is operated for connecting a ground to conductor PF of circuit PTC499 (FIG. 15). The ground completes a path for operating of relay F in circuit PTC499 in series with a conventional trunk test relay TT (not shown herein, see Busch patent FIG. 66) in the marker. The latter path is from conductor PF via terminal PF499 of FIG. 15, cross-connections to terminal PTG4, trunk block 4 relay contacts (not shown), conductor CPTG4, and the contacts MR4–10 and TGT1–8 to ground. The ground on conductor PF passes through contact PR–2 and a conventional F relay winding of circuit PTC499 back to a negative potential supplied through a trunk test relay TT (not shown) in the marker via a conventional busy test lead BT19 and connector TLMC. Relay F in circuit PTC499 operates in the described path and subsequently provides for conventional supervision of call connections cut through the line and trunk link network.

In a similar fashion, when trunk circuit PTC499 is in a nonpreferred status and is to be selected for call service, its PR relay is released and its conductors CF and PF receive a ground signal via terminals F499 and PF499, respectively, of FIG. 15, cross-connections to terminals TG4 and PTG4, contacts (not shown) of the trunk block 4 relay, conductors CTG4 and CPTG4, and the contacts TPT–14, MR4–10 and TGT1–8 to ground. The ground on conductor CF or PF of circuit PTC499 extends via contact PR–4 or PR–2 to the winding of relay F for operating that relay in series with a trunk test relay TT in the marker as priorly explained. The operations which occur thereafter in the marker, trunk circuit PTC499, and the line and trunk link frames for establishing call connections are essentially the same as described in the Busch patent for dial tone calls beginning in column 25.

It is salient to note that the marker routinely connects test tone detector circuitry TTDC of FIG. 20 to established call connections through the line and trunk link frames to detect thereon the presence of a test call identifying tone prior to the extension of call connection through the position trunk circuit and the alerting of the associated operator position to the call. Upon the detection of such a tone, relay TGT1 operates under control of circuitry TTDC for effecting the release of the established call connections and the selection of a test trunk in a manner as described in the aforementioned Fenstermaker et al. patent application.

Class Control Circuit (FIG. 16)

During the establishment of call connections between a service requesting line and a selected preferred or nonpreferred trunk, the marker transmits class-of-call data to a class control circuit CCO–CCn which is subsequently used for advising an operator of the type of service desired by the calling party and thereby enabling her to expeditiously provide the correct service to the customer. A marker M0–M4 transmits the class-of-call data from a class transmitter CT of FIG. 20 to a class control circuit CCO–CCn via a trunk link marker connector TLMC, a trunk link frame and a position trunk circuit. The class control circuit provides for the temporary storage and control of class-of-call data and the display of such data on class lamps located at the operator position.

Each class control circuit is selectively arranged for operations with local and remote operator position arrangements. For local positions, the class data is transmitted from transmitter CT by conventional DC signaling to the class control circuit for storage on one of five memory relays. Remote position arrangements utilize the class control circuit at a location proximate to the operator and cause a marker to send class data from transmitter CT in a conventional manner over the talking path conductors to the class control circuit by tone signals which are translated in a conventional manner to operate the memory relays. Following the data storage, the class control circuit causes the associated one of position, trunk and control circuits PCC0–PCC499 to send a zip tone to the operator and to light a class lamp for aiding the operator in serving the call.

In the specific illustrative embodiment, a local operator position arrangement is disclosed with specific reference to the class control circuit CCn. The latter is connected to position trunk circuit PTC499 via six conductors CCL1–CCL5 and CN. When a marker M0–M4 selects trunk circuit PTC499, the latter causes the operation of a connector relay CONN in circuit CCn by grounding the conductor CN. In operating, relay CONN connects relays CL1–CL5 through contacts CONN–1 to CONN–5 to conductors CCL1–CCL2 preparatory to the receipt of class information. Concurrently, trunk circuit PTC499 activates the associated circuit PCC499 for serving the call and thereafter circuit PCC499 operates relay STC in class control circuit CCn by applying a ground to conductor CST. The operation of relay STC starts a timing operation by a class error timer CTE by opening contact STC–1 and closing contact STC–2.

At a predetermined time after the selection of trunk circuit PTC499, the latter conveys a class signal from the marker class transmitter to one of the class leads CCL1–CCL5 for operating the associated class relay CL1–CL5, for example relay CL5, which thereupon locks via its contact CL5–1 and ST–3 to ground. The operation of a relay CL1–CL5 also causes timer CTE to be reset through a conventional one-and-one only configuration of contacts CL1–2 to CL5–2, CL1–3 to CL5–3, and CL1–4 and CL4–4. The contact configuration insures that only a valid class signal is received, otherwise timer CTE continues trouble timing. In operating, a CL1–CL5 relay conveys the class signal to the position, trunk, and control circuit PCC499 by a ground via its contacts CL1–5 to CL5–5 the associated one of the CC0–CC5 leads.

Relay CONN is thereafter released by trunk circuit PTC499 for causing a zip tone to be applied by position circuit PCC499 to the operator. Circuit PCC499 applies the tone in a conventional manner in response to a ground supplied to conductor TN via contacts STC–4 and CONN–6 and an operated one of the contacts CL1–7 to CL5–7. Subsequently, a customer-to-operator connection is cut through the position trunk circuit PTC499 and circuit PCC499 to position P499 for call service. During the operator service, supervision over established call connections is maintained in a conventional manner.

When the calling party disconnects, circuit PCC499 releases relay STC in the class control circuit CCn. In releasing, relay ST opens the locking path for the operated one of the class relays CL1–CL5 which, in turn, effects the deenergizing of the associated class lamp at position P499. The remainder of the call connections through the network are then released in a conventional manner.

In the event that a marker M0–M4 selects the trunk circuit PTC499, but either it does not provide adequate class information or the circuit PTC499 causes more than one of the class leads CCL1–CCL5 to be grounded, call connections are not cut through and after a prescribed time, a marker forces a conventional trouble record to be made as in the Busch system. Following the production of the record, trunk circuit PTC499 releases relay CONN which releases the falsely operated relays CL1–CL5. The position circuit PCC499 and the class control circuit CCn are next restored to their idle state preparatory to a second attempt to complete the call.

A second try is made by the marker to establish the proper class information in a manner as priorly described for a successfully completed call. If the class information is again inadequate or if more than one class relay is operated, another trouble record is made and importantly, in contrast to the first try, timer CTE times-out to cause the operation of relay TMR. Upon operating, relay TMR grounds lead TN via contact TMR–3 to signal circuit PCC499 to send a zip tone to position P499. The operation of relay TMR also grounds lead CCO via contact TMR–2 to cause lamp to be energized at position for indicating that no class information is available. Thereafter, a customer-to-operator connection is cut through the position trunk circuit PTC499 and circuit PCC to position P499 for operator call service.

It is to be understood that the hereinbefore described arrangements are illustrative of the application of principles of our invention. In light of this teaching, numerous other arrangements may be devised by those skilled in the art without departing from the spirit and scope of the invention.

What is claimed is:

1. A trunk gating arrangement for a switching system having a plurality of blocks of trunks and each of said blocks including trunks assigned to serve an individual one of a group of different classes-of-calls served by said trunk block, comprising
   means operable for establishing a preferred status for each one of said trunks available for serving a call and a nonpreferred status for each one of said trunks busy serving a call,
   means automatically gating the operation of said establishing means to change to a preferred status ones of said nonpreferred trunks which serve said one class-of-calls and which become available for serving a call, and
   means for selectively effecting said automatic gating operation only after each of said preferred trunks assigned to serve said one of said classes-of-calls is engaged for serving a call.

2. A trunk gating arrangement in accordance with claim 1 further comprising
   means cooperating with said establishing means and being responsive to the receipt of a call in any of said classes-of-call for selecting for the service of said received call a preferred one of said trunks assigned to serve said class-of-call in any of said trunk blocks and in preference over any available nonpreferred trunk assigned to the same class.

3. A trunk gating arrangement in accordance with claim 2 further comprising
   means for selectively conditioning said selecting means to select an available one of said nonpreferred trunks assigned to serve said class-of-received call in preference over a predetermined one of said preferred trunks assigned to the same class.

4. A trunk gating arrangement in accordance with claim 1 further comprising
   means for testing each of said trunk blocks to determine the availability of preferred trunks for serving said one class-of-call,
   means determining an interval within which the availability of preferred trunks is determined,
   and means activated at the expiration of said interval for automatically advancing to effect said automatic gating operation.

5. A trunk gating arrangement in accordance with claim 4 further comprising
   means effective at the expiration of said interval upon a determination by said testing means of the availability of a preferred one of trunks to serve said one class-of-call for blocking the activation of said advancing means under predetermined conditions and effecting an alternative advance to select an available nonpreferred one of said trunks for serving said one class-of-call instead of any preferred trunk assigned to serve said one class-of-call.

6. A trunk gating arrangement in accordance with claim 1 wherein said gating means comprises an individual trunk gate circuit for each one of said classes-of-call served by trunks in said trunk blocks, each said circuit comprising
   circuitry operable for gating the operation of said establishing means to change to a preferred status in each of said trunk blocks each one of said nonpreferred trunks which serve said last-mentioned one of said classes-of-call and which become available for serving a call,
   and control means responsive to the receipt of a call in said last-mentioned one of said classes-of-call following an engagement of each of said preferred trunks serving said last-mentioned one of said classes-of-call for controlling the operation of said gating circuitry to effect said change to a preferred status of said available nonpreferred trunks.

7. A trunk gating arrangement in accordance with claim 6 wherein each said trunk gate circuit comprises
   means activated by said control means for determining a gate timing interval,
   means controlled by said gate timing means for enabling said gating circuitry to effect said gating operation of said establishing means for the duration of said gate timing interval to change to a preferred status in all of said blocks all nonpreferred trunks serving said last-mentioned one of said classes-of-call and which become available for serving a call during said interval.

8. A trunk gating arrangement in accordance with claim 7 further comprising
   means for selectively conditioning said testing means to test for the availability of nonpreferred trunks for serving said one class-of-call,
   means controlling said producing means for determining another timed interval during testing of said availability of nonpreferred trunks,
   and means activated by said testing means, during said other timed interval and upon a determination by said testing means that a prescribed one of said nonpreferred trunks is available for serving said one class-of-call, for selecting said prescribed trunk for call service in preference over any said preferred trunk.

9. In combination,
   a plurality of blocks of trunks,
   a switching network operable for extending call connections to said trunks,
   trunk gating means responsive to the receipt of a call for gating said trunks to establish in said blocks a preferred status for ones of said trunks and a nonpreferred status for other ones of said trunks therein,
   means responsive to the receipt of other calls for selecting ones of said trunk blocks having said preferred trunks before any of said trunk blocks having nonpreferred trunks for connection on said other calls,
   and means activated by said selecting means for operating said network to extend individual connections for each of said other calls to an individual one of said trunks in said selected blocks.

10. The combination in accordance with claim 9 wherein
   each of said blocks comprises trunks serving different classes-of-calls,
   and said trunk gating means comprises an individual trunk gate circuit for each one of said classes-of-call for gating said trunks serving said one class-of-call to establish in said blocks said preferred status for idle ones and a nonpreferred status for busy ones of said last-mentioned trunks
   and means for maintaining said established nonpreferred status for said nonpreferred trunks until a call has been extended to each of said preferred trunks.

11. An automatic call distributor system comprising
   a plurality of blocks of trunks,
   a plurality of teams of operator positions, each of said teams having one of said positions connectable to an individual one of said trunks,
   a plurality of incoming lines,
   a switching network operable for establishing connections between said lines and trunks,
   position trunk gate means for gating said trunks to establish for each of said trunk blocks a first preferred status for said trunks connectable to idle manned ones of said positions and a second preferred status for other ones of said trunks connectable to busy ones of said positions,
   means responsive to the receipt of calls on said lines for selecting ones of said trunk blocks having said first preferred trunks before any of said trunk blocks having only said second preferred trunks for connection to said calling lines, and means activated by said selecting means for operating said network to establish individual connections between each said calling line and one of said trunks in a selected one of said trunk blocks.

12. In an automatic call distributor system having
a plurality of position trunks,
a plurality of teams of operator positions, each of said teams having one of said positions connectable to an individual one of said trunks,
a plurality of incoming lines,
a switch network operable for establishing connections between said lines and trunks and comprising trunk link means terminating said position trunks in blocks,
and marker control means responsive to the receipt of calls on said lines for operating said network to establish connections from calling ones of said lines to available ones of said position trunks,
the invention comprising
a plurality of position trunk circuits, each of said circuits connected to an individual one of said trunks and said trunk link means for connecting said individual one of said trunks to an individual one of said positions, and including preference means operable for supplying to said trunk link means preference signals for establishing preferred or nonpreferred status of availability for said connected trunk for connection through said network to a calling one of said lines,
trunk gate means controlled by said marker control means for operating said preference means in each of said trunk circuits to establish said preferred status for each of said trunks connectable to an idle manned one of said positions and said nonpreferred status for each of said trunks connectable to busy ones of said positions and including means for maintaining said nonpreferred status for said trunks which subsequently become idle and until preferred ones of said trunks are connected to calling ones of said lines,
and said marker control means being responsive to said preference signals from said trunk link means for selecting preferred ones of said trunks in each of said blocks before nonpreferred ones of said trunks for connection through said network to calling lines.

13. The invention according to claim 12 wherein
said trunk link means comprises a plurality of trunk link frames each terminating a plurality of blocks of said position trunks,
said preference means in each of said trunk circuits supplies said preference signals to a respective trunk block terminated on one of said frames for establishing said preferred or nonpreferred status of availability for said connected trunk,
and said marker control means comprises means operable for testing each of said blocks of position trunks on said frames for preferred or nonpreferred preference signals, and means activated on each said call for operating said testing means to test for said preferred signals in each of said blocks before an operation of said testing means to test for nonpreferred signals in each of said blocks.

14. The invention according to claim 13 wherein said marker control means includes
timer means activated under control of said testing means for determining a timed interval within which said testing means tests for preferred signals in each of said trunk blocks,
means responsive to a detection of a preferred signal for one of said trunks in a block on one of said frames which is then unavailable for establishing call connections to a calling line for automatically advancing the operation of said testing means at the end of said interval to test for said nonpreferred signals in each of said trunk blocks,
and means cooperating with said testing means on said advancing operation for selecting for a connection through said network to a calling one of said lines, a nonpreferred one of said trunks in one of said blocks on another one of said frames before any preferred one of said trunks on said unavailable one of said trunk link frames.

15. The invention according to claim 13 wherein said marker control means includes
timer means activated under control of said testing means for determining a timed interval within which said testing means tests for preferred signals in each of said trunk blocks,
means controlled by said testing means upon the detection of a preferred signal for at least one of said trunks in a trunk block on one of said frames then available for establishing call connections to a calling line for automatically deactivating said timer means to cancel the determination of said timing interval,
and means selectively activated at the expiration of said timing interval when said preferred signals are absent in said trunk blocks for automatically advancing the operation of said testing means to test for said nonpreferred signals in each of said trunk blocks.

16. The invention according to claim 15 wherein a plurality of different classes-of-calls are received on said lines for connection through said network to said position trunks and wherein each of said teams of operators is arranged to serve at least one of said classes-of-calls, the combination wherein said marker control means includes
means responsive to the receipt of each of said calls for determining the respective class of each,
and said testing means being controlled by said class determining means to test in a prescribed order for preferred and nonpreferred signals of said trunks to said operator positions conditioned to serve the class of said last-mentioned call.

17. The invention according to claim 16 wherein said
trunk gate means includes an individual trunk gate circuit for each one of said classes-of-calls,
said gate circuit comprising preference controlling means for controlling said preference means in each of a plurality of said trunk circuits for establishing said preferred or nonpreferred status of availability for said trunks connected to respective ones of said last-mentioned trunk circuits,
and said preference controlling means being operated in response to the activation of said advancing means for operating said preference means in each of said last-mentioned trunk circuits to establish said preferred status for each of said trunks both connected to one of said last-mentioned trunk circuits and connectable to a then idle manned one of said positions.

18. The invention according to claim 17 wherein
each of said blocks of position trunks on each of said trunk link frames comprises position trunks for serving each of said classes-of-calls and each of said last-mentioned trunks being selectively assigned to serve an individual one of said classes-of-calls,
said preference means in each of said trunk circuits comprises a preference relay operable for controlling said supply of preferred and nonpreferred signals to said trunk link frames,
and said operation of said preference controlling means in each of said individual trunk gate circuits being effective to cause the operation of said preference relay in each one of said plurality of trunk circuits to establish said preferred status for each of said trunks in said blocks which trunks serve said individual one of said classes-of-call and are then available for connection to an idle one of said positions.

19. The invention according to claim 18 wherein
said marker control means comprises a plurality of marker circuits including said advancing means for individually controlling the activation of said preference controlling means in each of said trunk gate circuits, whereby said preferred and nonpreferred status for each of said position trunks is established for each of said classes-of-calls.

20. The invention according to claim 19 wherein each of said trunk link frames comprises terminal means marked by said supplied preferred and nonpreferred signals from said trunk circuits, said testing means comprises an individual testing arrangement in each of said marker circuits, each said testing arrangement being controlled by said class determining means and advancing means for testing in a prescribed order said terminal means for preferred and nonpreferred signals for said trunks and for each of said classes-of-calls, and said marker control means further including means responsive to said last-mentioned testing on each one of said classes-of-calls received on said lines for selecting preferred status ones of said trunks serving said last-mentioned one of said classes-of-calls in each of said blocks on each of said trunks link frames before nonpreferred status ones of said trunks serving the same one of said classes-of-calls.

21. Preferred and nonpreferred operator position trunk gating equipment for a plurality of classes-of-calls distributed from calling lines through a switching network to operator position trunks of a call distributor system wherein each of said trunks is terminated in trunk blocks in said switching network and each of said blocks terminates one of each of said trunks to serve an individual one of said classes-of-calls whereby each of said trunk blocks serves each of said classes-of-calls, the invention comprising a plurality of trunk circuits, each of said circuits connected to an individual one of said trunks and including means operable for establishing in said network a preferred status for said individual one of said trunks connectable to an idle manned operator position and a nonpreferred status for said individual one of said trunks during the time it is engaged on call connections, and a plurality of position trunk gate circuits each being individually associated with one of said classes-of-calls and being responsive to the receipt of control signals at predetermined intervals for operating said establishing means to establish said preferred or nonpreferred status for all of said trunks serving the same said one of said classes-of-calls.

22. Preferred and nonpreferred operator position trunk gating equipment according to claim 21 wherein each said position trunk gate circuit comprises means for maintaining said nonpreferred status for each of said trunks serving said same class-of-call, which trunk subsequently is disconnected from call connections, until all said preferred ones of said trunks serving the same class-of-call are connected to calling ones of said lines.

23. Preferred and nonpreferred operator position trunk gating equipment according to claim 22 wherein said establishing means in each said trunk circuit is responsive to the connection of said last-mentioned circuit on a call for changing the status of said connected individual one of said trunks from preferred to nonpreferred in said network, and each said position trunk gate circuit further comprises means responsive to the receipt of a control signal in the absence of a preferred status trunk for said one class-of-call for gating said establishing means for establishing a preferred status for all idle nonpreferred status trunks assigned to serve said one class-of-call and then being connectable to an idle manned operator position.

24. Preferred and nonpreferred operator position trunk gating equipment according to claim 23 wherein said gating means in each said position trunk gate circuit gates said establishing means of said trunk circuits in all of said trunk blocks through said switching network, and each said position trunk gate circuit further comprises means for timing said gating to enable said establishing means to establish a preferred status for all nonpreferred status trunks which serve said one class-of-call and which become idle and available for connection to an idle manned operation position during said timing.

* * * * *